(12) United States Patent
Barron

(10) Patent No.: US 11,974,653 B2
(45) Date of Patent: May 7, 2024

(54) BACKPACK SYSTEM WITH IMPROVED DETECTION OF CATASTROPHIC EVENTS

(71) Applicant: Jack Barron, Southborough, MA (US)

(72) Inventor: Jack Barron, Southborough, MA (US)

(*) Notice: Subject to any disclaimer, the term of this patent is extended or adjusted under 35 U.S.C. 154(b) by 0 days.

(21) Appl. No.: 17/453,498

(22) Filed: Nov. 4, 2021

(65) Prior Publication Data
US 2022/0175116 A1 Jun. 9, 2022

Related U.S. Application Data

(63) Continuation-in-part of application No. 17/113,087, filed on Dec. 6, 2020.

(51) Int. Cl.
| | |
|---|---|
| *A45F 3/04* | (2006.01) |
| *B63C 9/125* | (2006.01) |
| *B63C 9/20* | (2006.01) |
| *G01S 1/04* | (2006.01) |
| *A45F 3/00* | (2006.01) |
| *B63C 9/00* | (2006.01) |

(52) U.S. Cl.
CPC .............. *A45F 3/04* (2013.01); *B63C 9/1255* (2013.01); *B63C 9/20* (2013.01); *G01S 1/0423* (2019.08); *A45F 2003/003* (2013.01); *B63C 2009/0017* (2013.01)

(58) Field of Classification Search
CPC .......... A45F 2003/001; A45F 2003/003; A45F 2003/045; A45F 3/04; A45F 3/047; A45F 4/02; B63C 2009/0017; B63C 2009/0029; B63C 2009/0041; B63C 2009/0047; B63C 2009/0052; B63C 2009/0058; B63C 9/125; B63C 9/1255; B63C 9/15; B63C 9/155; B63C 9/20; G01S 1/0423
USPC .......................................................... 383/3
See application file for complete search history.

(56) References Cited

U.S. PATENT DOCUMENTS

| | | | |
|---|---|---|---|
| 6,270,386 B1* | 8/2001 | Visocekas ............ | A63B 29/021 441/89 |
| 2015/0228174 A1* | 8/2015 | Bauer ...................... | A45F 4/02 340/539.13 |

FOREIGN PATENT DOCUMENTS

WO    WO-2016131756 A1 * 8/2016

OTHER PUBLICATIONS

WO-2016131756-A1 Translation, Eckel A, Aug. 2016 (Year: 2016).*

* cited by examiner

*Primary Examiner* — Nathan J Newhouse
*Assistant Examiner* — Matthew T Theis

(57) ABSTRACT

A modular backpack system includes a personal floatation harness having an automatic inflator mechanism and pack attachment features; and a plurality of pack modules selectively attachable to the pack attachment features to form a floatation-enhanced backpack. Each one of the plurality of pack modules may further include a different arrangement for accommodating accessories. For example, the different arrangements may include arrangements having different compartments. Other arrangements may have different attachment features. The different attachment features may include different lash points. The backpack module may be one taken from the list of: a pack adapted for kayaking with a waterproof compartment and lash points for ready access to accessories; a pack adapted for sailing with waterproof and non-waterproof compartments; a pack adapted for hiking with multiple compartments for tools and supplies; and a pack adapted for everyday carry (EDC) having multiple quick-access compartments for carrying everyday tools.

12 Claims, 21 Drawing Sheets

BACKPACK SYSTEM WITH IMPROVED DETECTION OF CATASTROPHIC EVENTS

RELATED APPLICATIONS

The present application defines an improvement on the Inventor's prior work as described and claimed in the Inventor's prior pending U.S. patent application Ser. No. 17/113,087 filed Dec. 6, 2020, describing and claiming improvements to issued U.S. Pat. No. 10,039,359 B2 Issued Aug. 7, 2018, based on U.S. patent application Ser. No. 15/418,672 filed Jan. 27, 2017, claiming domestic priority to U.S. provisional patent application No. 62/355,455 filed Jun. 28, 2016. The present application also defines an improvement over the Inventor's prior work as described in international patent application publication number WO/2018/006103 published Jan. 4, 2018, based on international patent application number PCT/US2017/044392 filed Jul. 28, 2017.

BACKGROUND OF THE INVENTION

Travel today is full of delightful new experiences, but also fraught with terrifying new dangers. International shipping is the life-blood of modern commercial and military operations. Terrorism and other threats to every mode of transportation appear almost daily. A travel case that adapts to the varied activities of the modern traveler, military operative or other operative while it protects one's possessions, the peace of mind of one's loved ones and possibly one's own life would be useful to today's world traveler, as would a shipping travel case that protects one's valuable commercial, personal, and military goods.

SUMMARY OF THE INVENTION

A travel case according to aspects of embodiments of the invention may include one or more of any of the following features and/or elements either individually or in combination. It is contemplated that the invention may include any combination and/or permutation of these features.

According to one embodiment, the modular backpack system includes: a personal floatation harness having an automatic inflator mechanism and pack attachment features; and a plurality of pack modules selectively attachable to the pack attachment features to form a floatation-enhanced backpack. Each one of the plurality of pack modules may further include a different arrangement for accommodating accessories. For example, the different arrangements may include arrangements having different compartments. According to another example, the different arrangements may include arrangements having different attachment features. The different attachment features may include different lash points. In various embodiments, the backpack module may be one taken from the list of: a pack adapted for kayaking with a waterproof compartment and lash points for ready access to accessories; a pack adapted for sailing with waterproof and non-waterproof compartments; a pack adapted for hiking with multiple compartments for tools and supplies; and a pack adapted for everyday carry (EDC) having multiple quick-access compartments for carrying everyday tools.

In some variations, the system may include a case body defining an interior cavity in which to carry articles and an exterior shell; an inflatable floatation aid fixed to the exterior shell; an inflator in communication with the inflatable floatation aid, for inflation of the inflatable floatation aid; and a locator beacon fixed to the exterior shell, including a communications transmitter capable of signaling a remote party and a geo-locating apparatus. In further variations, the locator beacon employs a Global Navigation Satellite System (GNSS) to determine location. In yet further variations, the GNSS is the US Global Positioning System (GPS). In yet a further variation, the locator beacon employs radio tower triangulation to determine location. In another variation, the inflatable floatation aid is separable from the case body and fixed to the exterior shell by an extendible tether. In yet another variation, the inflator operates automatically. In a further variation, the inflator operates by introduction of water that may dissolve a pill-cage pill, or may operate by submersion, which may be detected via hydrostatic pressure sensing. In another variation, the locator beacon operates automatically responsive to operation of the inflator. In a further variation, the travel case further comprises: sensors sensitive to environmental parameters of the travel case; wherein the locator beacon operates automatically responsive to sensor inputs indicative of a catastrophic event. In a yet further variation, the sensors include at least one of a GPS locator, an accelerometer, and a magnetometer. In an even yet further variation, the travel case includes a processor that activates and prevents operation of the inflator and/or that activates and prevents operation of the locator beacon. In other variations, the locator beacon operates automatically on a periodic basis. In another variation, the locator beacon is connectable to a two-way, wireless data network, whereby the locator beacon can send and receive messages to a recipient endeavoring to locate the travel case after it has become lost. In a further variation, the locator beacon operates on demand, responsive to an operator. The locator beacon may be a search and rescue beacon operating on 121.5 MHz and/or 406 MHz, a beacon communicating with a cell-tower, a satellite phone service. In another variation, a programmable display affixed to the case body on which origin, destination, owner, and/or vessel identification information is displayed. In yet another variation, the programmable display is affixed to the inflatable floatation. In even yet another variation, the programmable display is of a type that retains on display a most recently programmed data set in the event of a power failure. The programmable display may be an electronic ink display.

In the following description reference is made to the accompanying drawings, which form a part hereof, and in which are shown example implementations. It should be understood that other implementations are possible, and that these example implementations are intended to be merely illustrative.

DETAILED DESCRIPTION

Figure 1:
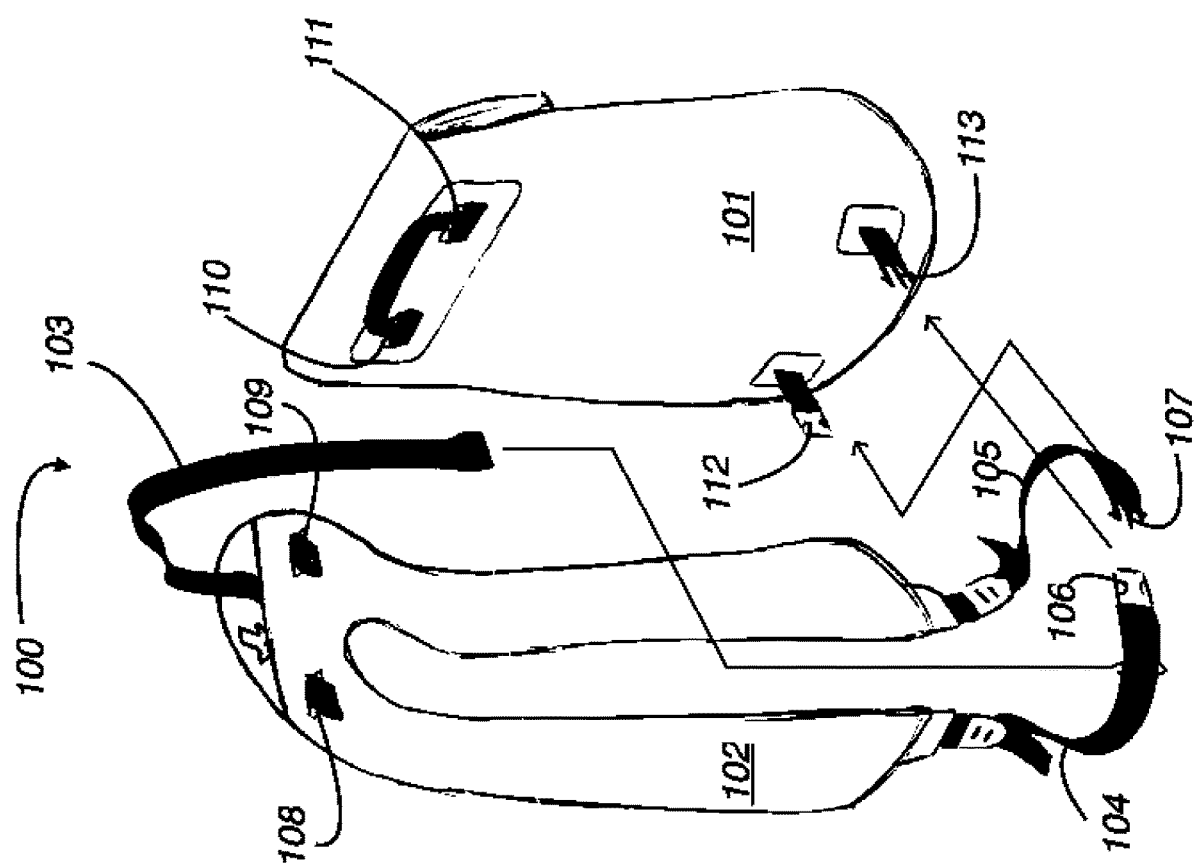
FIG. 1 is a perspective view of a system embodying various aspects of the invention.

The following section describes in detail an exemplary embodiment of the invention illustrating by example its principles of construction and usage. Referring to the drawings, the elements of the exemplary embodiment, their relationships to each other, and several alternatives are now described.

The travel case according to aspects of the present invention may include a number of features, including features that safeguard the travel case from sinking if separated from the vehicle in which it may be carried, features that bring the case safely to Earth's surface in the event of an air catastrophe, and features that aid in identifying the location of the travel case if an unexpected or catastrophic event befalls the vehicle in which it may be carried, and features that communicate that location to potential search and rescue personnel or others in the event of a separation, unexpected, or catastrophic event.

The travel case of the present invention includes any desired combination of novel and conventional components and aspects that will be described here, to permit the inventive aspects to be understood more clearly. For example, the case may be based on a hard-shell design or soft-shell design. Cases to which the invention applies may include zipper closures, snap locks, keyed and combination locks, and other conventional closures employed on travel cases. Some travel cases to which the invention applies may include water resistant shells and closure seals providing any desired degree of water resistance from none at all to resistance to impact immersion and submersion to a set depth. Case interiors may include various packing aids and options, such as toiletry bags or compartments, lingerie pockets, folding frames and hangers for suits, shirts, and other clothing susceptible to creasing, etc. A special compartment accessible from the outside of the case may be provided to store emergency supplies. For example, emergency hydration and/or dry nutrition products may be stored in the special compartment. Hydration products may be stored in either a TSA-compliant one-quart package for liquids in 100 ml or smaller containers, or in a TSA-non-compliant manner if permitted for the travel plans of the user.

The term travel case should be understood to include cases for equipment, cases for special goods such as musical instruments or jewelry shipping containers, shipping containers for military equipment such as personal arms and other sensitive or valuable equipment, and other cases that generally resemble travel cases. Larger cases used as shipping containers for larger goods or larger quantities of good may also be considered to be travel cases for the purposes of this application. In general, travel cases are containers for personal articles, equipment, etc. that are small enough and light enough when loaded to be handled by an individual passenger or traveler. Excluded are containers whose primary purpose is to secure and deploy such safety equipment as EPIRBs, flight data recorders, vehicle data recorders, and the like. Aspects of the invention can be practiced using standardized intermodal containers that are used in intermodal freight forwarding or standardized air cargo containers such as Unit Load Devices (ULDs). Both intermodal containers and ULDs come in a wide variety of sizes and designs, but are adaptable to the aspects of the invention illustrated in connection with travel cases more generally.

Aspects of the invention include a travel case fitted with apparatus to provide individual passenger safety, tracking, and recovery features not found in conventional travel cases. Other aspects of the invention include other diverse and larger cases and containers fitted with apparatus providing additional safety, tracking, and recovery features not found in conventional cases and containers. Other aspects of the invention include methods for deploying safety, tracking, and recovery equipment and features from travel cases, other cases, and containers.

There has previously been no motivation to provide such functionality at an individual passenger level, in travel cases, because of several factors. One factor is the complete reliance in the transportation industry on vehicle-level systems, rather than passenger-level systems, which are perceived by carriers to add cost and complexity, and were considered to have insufficient reliability for general reliance. Another factor is the space taken away from passenger luggage space to incorporate conventional safety equipment into typical travel cases. Yet another factor is the expectation that "hardened," that is highly durable, specialty safety equipment is more likely to survive a catastrophic event than personal electronics or the like.

It is understood and intended that the aspects of the invention described below intrude minimally, if at all, into the packing volume of the travel case. Rather, the features described are designed to be flat and integrated with the hard or soft shell materials, or occupy volumes within the shell that are unused or under-used in conventional case designs, such as those volumes that become unusable due to the integration of handles or wheels in the case body.

Modular Case System

Figure 2:
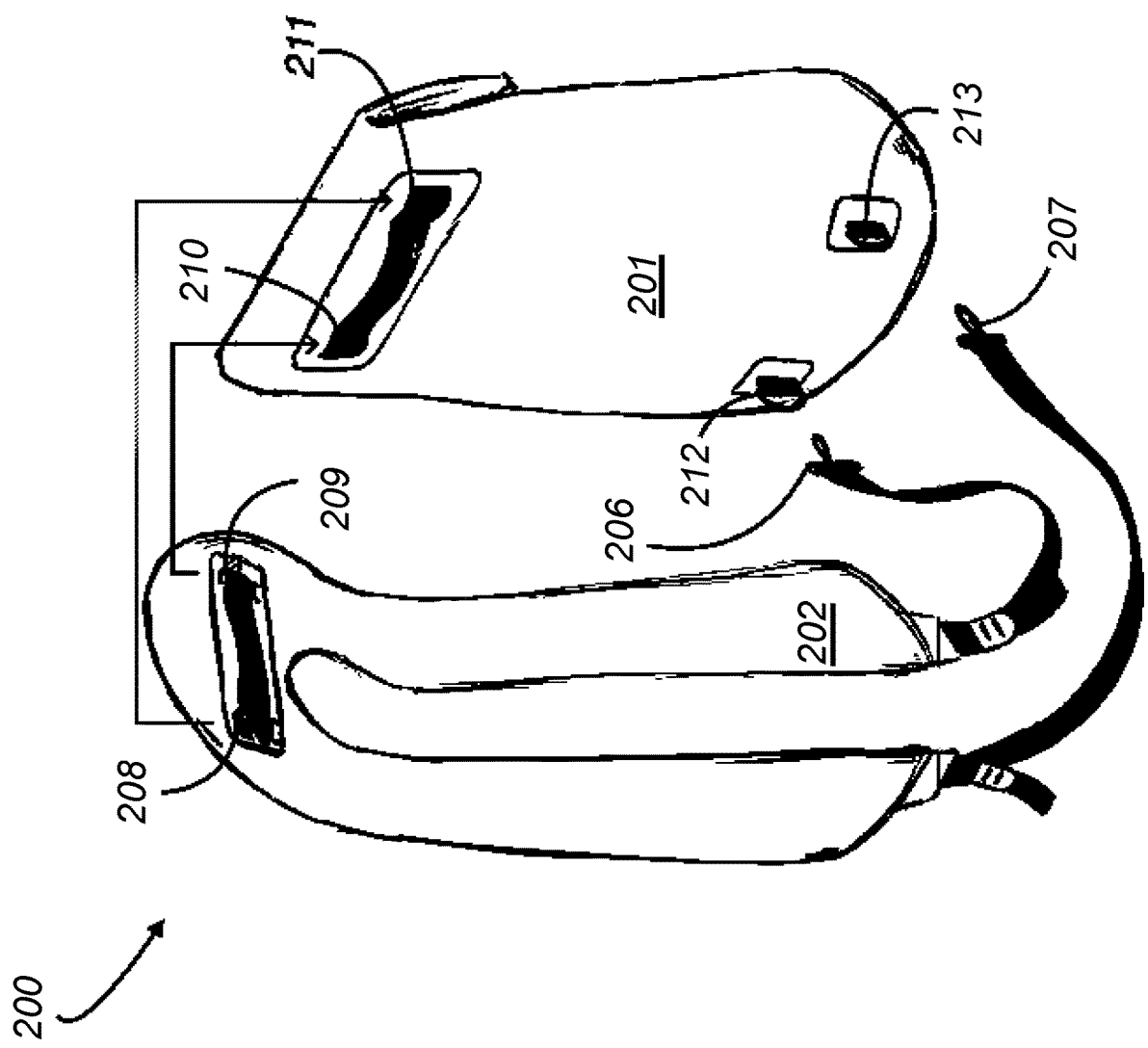
FIG. 2 is a perspective view of another system embodying various aspects of the invention.
Figure 3:
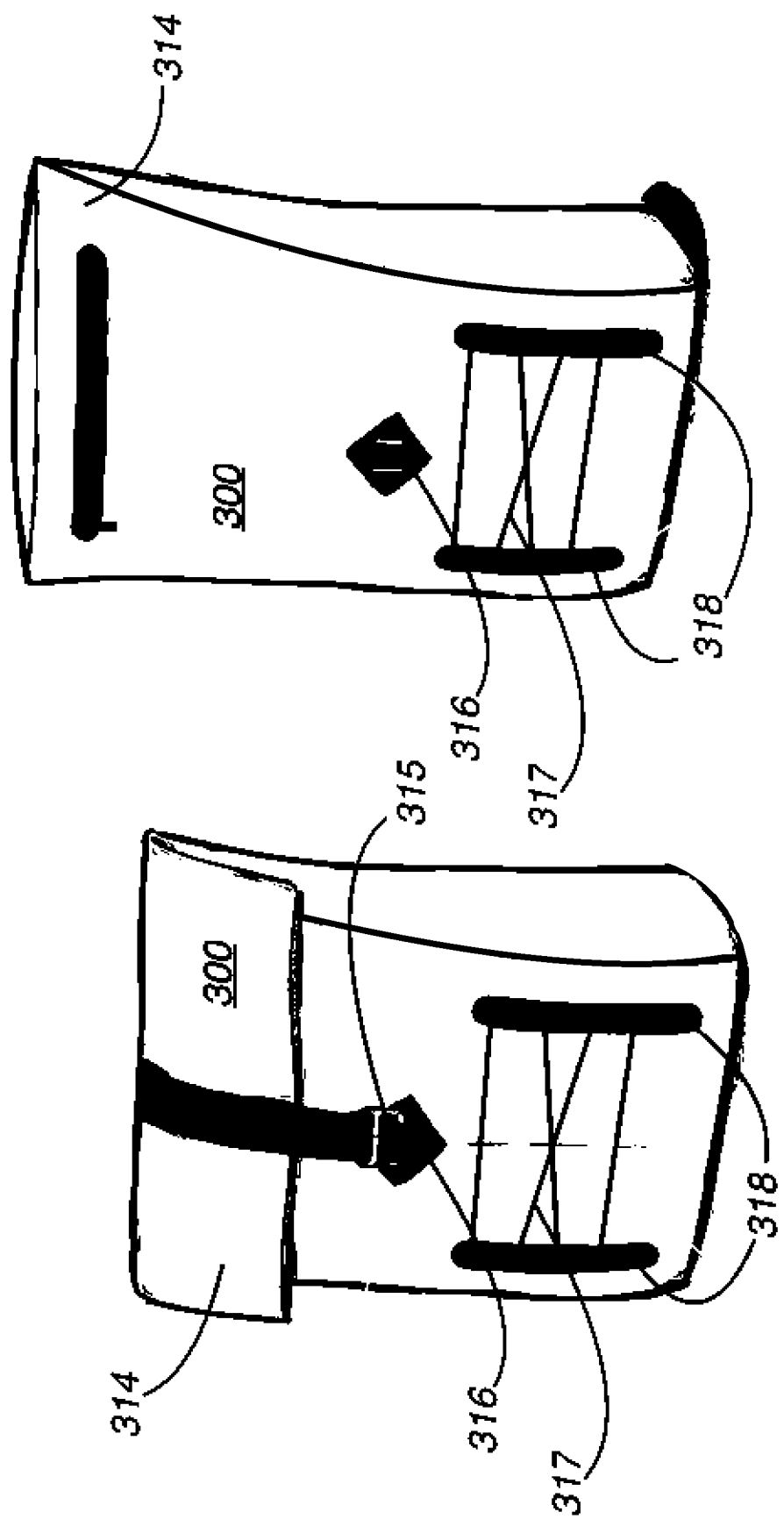
FIG. 3 is a perspective view of a kayaking module according to some aspects of the invention.
Figure 4:
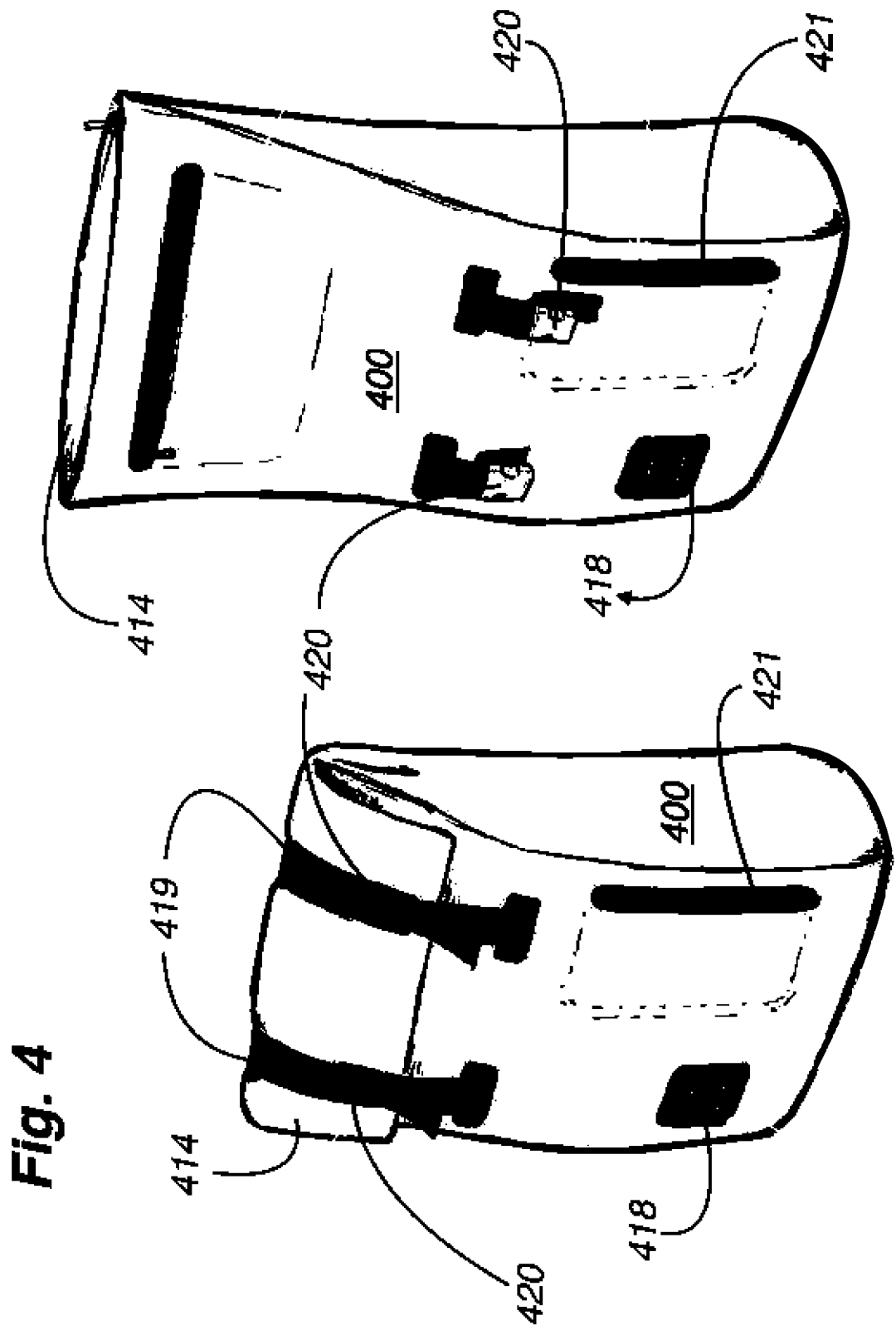
FIG. 4 is a perspective view of a hiking module according to some aspects of the invention.
Figure 5:
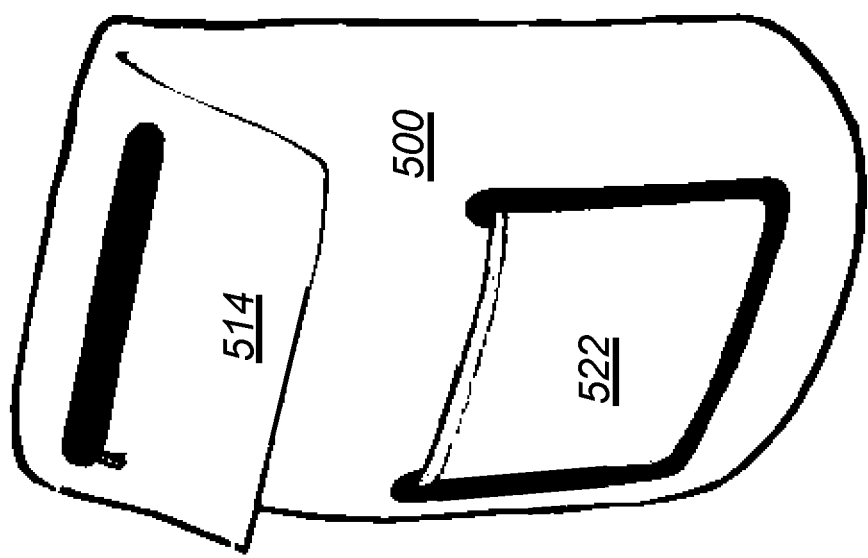
FIG. 5 is a perspective view of a daypack module according to some aspects of the invention.
Figure 6:
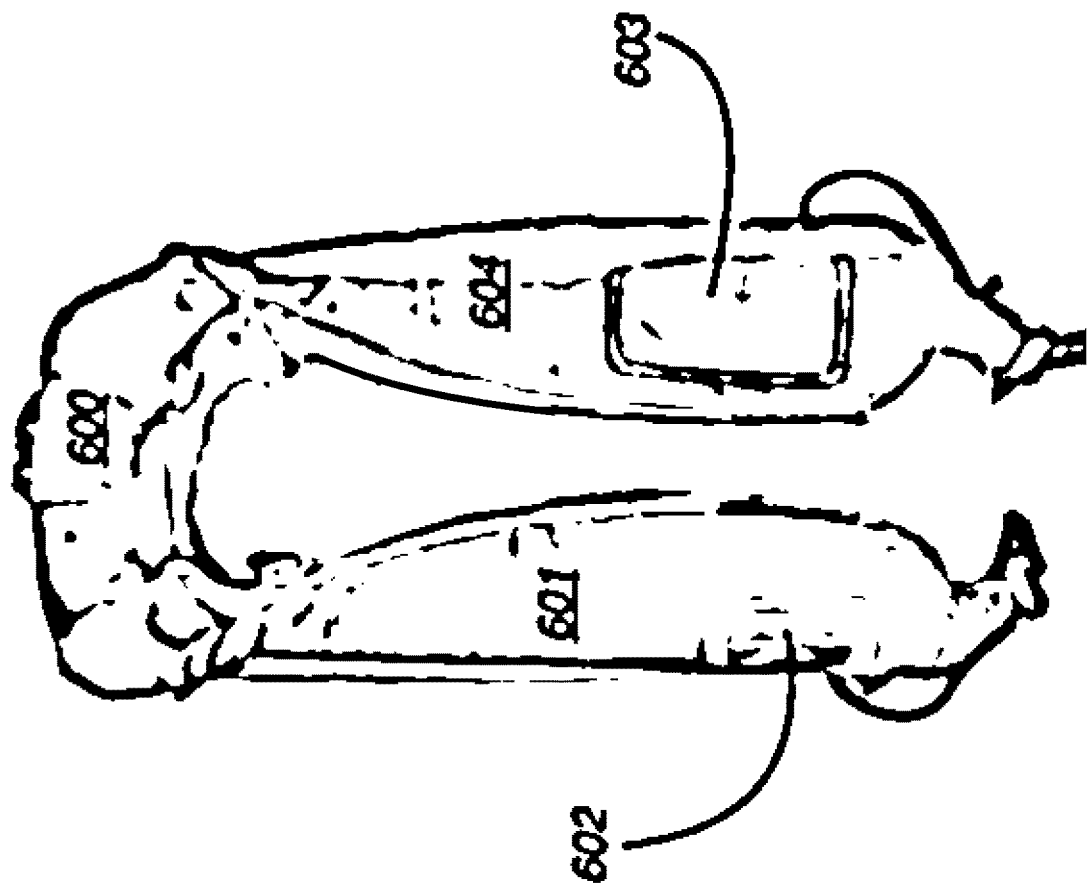
FIG. 6 is a perspective view of a flotation harness according to some aspects of the invention.
Figure 7:
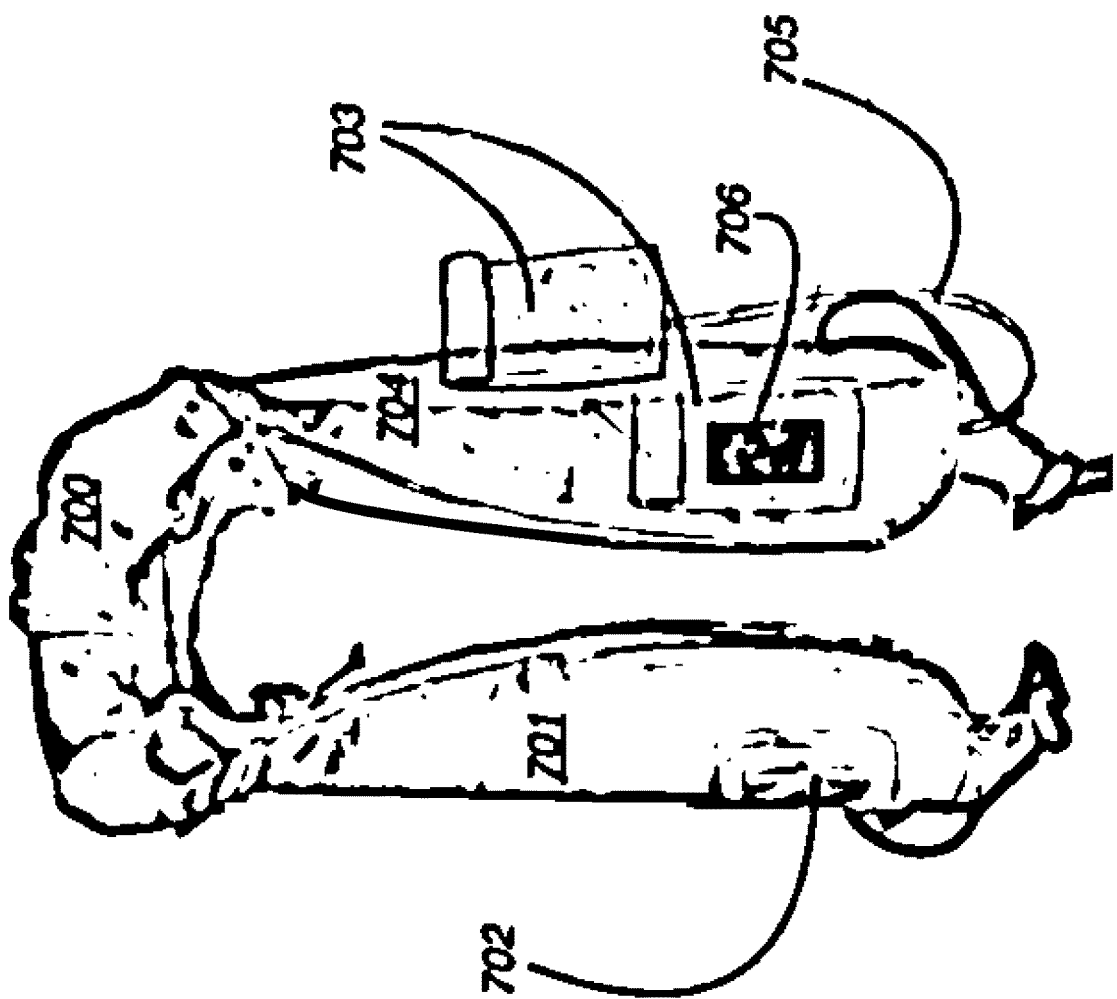
FIG. 7 is a perspective view of another flotation harness according to some aspects of the invention.
Figure 8:
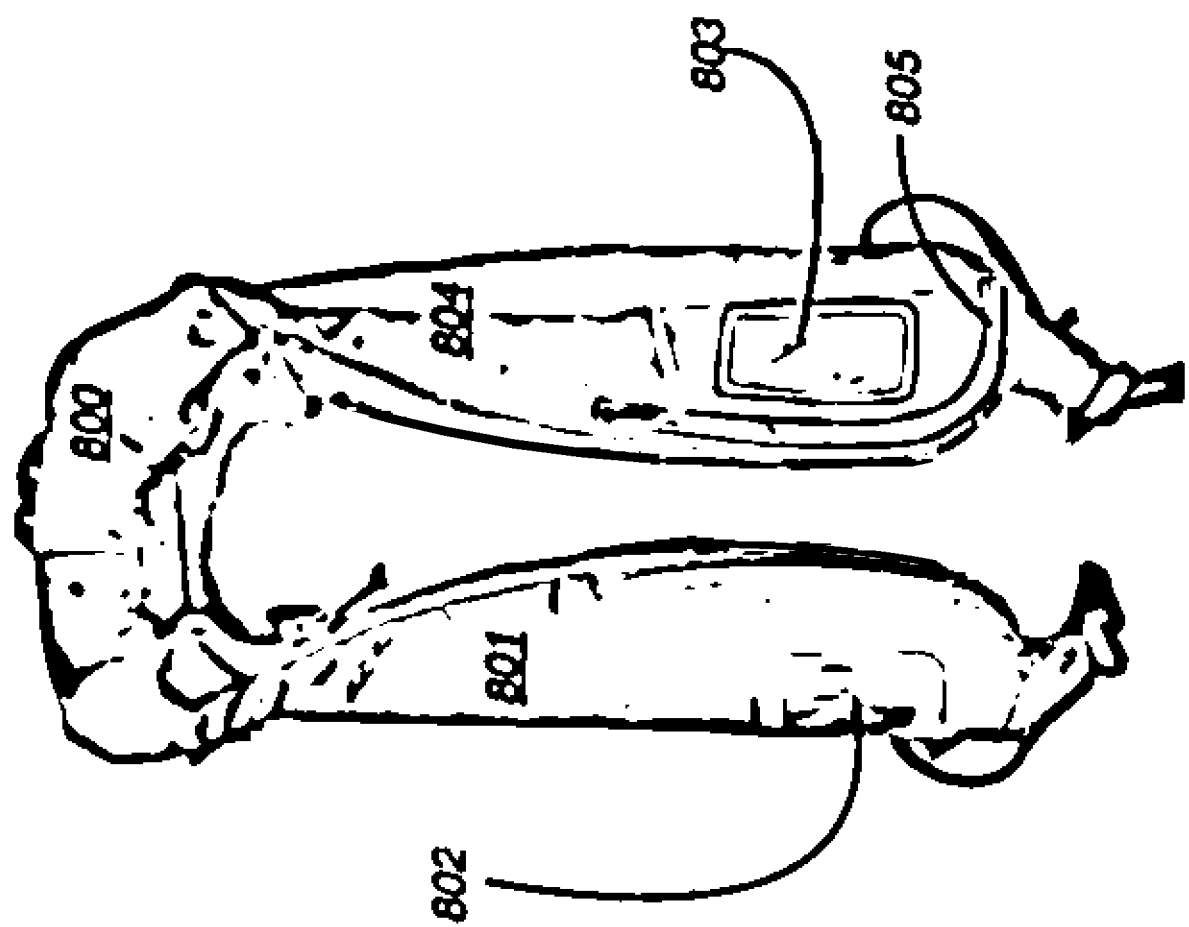
FIG. 8 is a perspective view of yet another flotation harness according to some aspects of the invention.

The modular case system is now described in connection with FIGS. 1-8. FIGS. 1-2 illustrate the complete modular system, including two exemplars of attachment mechanisms usable in connection with the invention. FIGS. 3-5 illustrate further exemplars of options for the pack modules; and, FIGS. 6-8 illustrate further exemplars of options for the flotation harness. An overview and discussion of attachment mechanisms is given first.

As shown in FIG. 1, a system 100 includes two main components—a pack module 101 (one of several possible choices), and a flotation harness 102. The flotation harness 102 includes a back strap 103 and two bottom straps 104, 105. The flotation harness 102 can be worn as a personal flotation device (PFD), separately from the system by threading the bottom straps through a loop at the end of the back strap 103 and connecting clips 106, 107 on the ends of the bottom straps 104, 105 to each other. The flotation harness 102 further includes two three-bar sliders 108, 109 that may be used in the system 100 to attach the pack module 101 to the flotation harness 102, as next described.

The pack module 101 includes two square rings 110, 111, and two connecting clips 112, 113. When the pack module 101 is in use in the system 100 the three-bar sliders 108, 109 of the flotation harness 102 are threaded through corresponding square rings 110, 111, and the connecting clips 106, 107 on the ends of bottom straps 104, 105 are connected to corresponding connecting clips 112, 113. The system 101 thus assembled is worn as an ordinary backpack or daypack, but with the added functionality of flotation, or any of the additional features described further below that may be incorporated in either the pack module 101 or the flotation harness 102.

FIG. 2 also shows a system 200 includes two main components—a pack module 201 (again, one of several possible choices), and a flotation harness 202. The system 200 of FIG. 2 differs from the system 100 of FIG. 1 in several details. In the interests of brevity and clarity, only the details in which FIG. 2 differs from FIG. 1 are described. Instead of connecting clips 106, 107, 112, and 113, system 200 employs corresponding snap clips 206, 207, that connect to D-rings 212, 213. Also, instead of three-bar sliders 108, 109 connecting by threading through corresponding square rings 110, 111, system 200 employs MOLLE clips 208, 209 connecting to fabric loops 210, 211. MOLLE clips are NATO-standard devices for use with Modular Lightweight Load-carrying Equipment, from which the acronym MOLLE is derived. Other clips and attachments capable of quick deployment and sufficient load carrying capacity may be substituted.

Kayaking module 300 is shown in FIG. 3. This pack module incorporates a zippered roll-top closure 314 secured by a G-hook 315 inserted through a lash-tab 316. This module 300 also includes a built-in elastic cord 317 for lashing wet clothes and the like to the outside of the waterproof pack, along with additional lash points 318 for attaching additional accessories.

Hiking module 400, shown in FIG. 4 includes a zippered fold-down closure 414 secured by webbing straps 419 with side-release buckles 420. A lash tab 418 serves as an attachment point for a light or additional accessories; while a secure, zippered pocket 421 is available to carry quick-access personal items such as a phone or wallet.

Daypack module 500, shown in FIG. 5 has similar features to those of hiking module 400, but omit the securing features on the top closure 514, and provide a simple mesh stuff pocket 522 for quick, casual access to often-needed personal items.

As shown in FIG. 6, the flotation harness 600 includes an inflator mechanism constructed in one lobe 601 and viewable through a window 602 sewn into a cover panel of that lobe 601, and may include a pocket 603 having a window sewn into a cover panel of a second lobe 604 of the harness 600. Such a pocket 603 is suitable for carrying a phone or handheld GPS device in a position from which it can be viewed or used.

FIG. 7 shows an alternative embodiment in which the flotation harness 700 includes an inflator mechanism constructed in one lobe 701 and viewable through a window 702 sewn into a cover panel of that lobe 701, and may include a pocket 703 made of a transparent material connected to a second lobe 704 by a tether 705 of webbing material sewn into a cover panel of the second lobe 704 of the harness 700. The pocket 703 may be secured to a surface of the cover panel of the second lobe 704 by a hook-and-loop fastener 706 or similar, so that it may be detached from the harness 700 for the purpose of more easily consulting the contents of the pocket 703 while the tether 705 keeps the pocket and its contents from being lost. Such a pocket 703 is suitable for carrying a phone or handheld GPS device in a position from which it can be viewed or used.

In FIG. 8, the flotation harness 800 includes an inflator mechanism constructed in one lobe 801 and viewable through a window 802 sewn into a cover panel of that lobe 801, and may include a pocket 803 having a window sewn into a cover panel of a second lobe 804 of the harness 800. Pocket 803 is readily accessible from outside of the cover panel of the second lobe 804 through a zipper 805 located in the cover panel of the second lobe 804. Such a pocket 803 is suitable for carrying a phone or handheld GPS device in a position from which it can be viewed or used.

Flotation and Air Recovery

The exterior of the body of the travel case (See FIGS. 10, 11, 12, 13, 15, and 16) Includes an inflatable bladder (1502, 1602), optionally covered by a suitably durable protective skin 1006. The durable protective skin 1006 may be formed with seams 1007 designed to separate when the bladder (1502, 1602) expands. The seams 1007 may be frangible, having weakened locations arranged to allow the expansion of the bladder when inflated, or the seams 1007 may be releaseably fastened to the body of the travel case to achieve the same effect. The protective skin 1007, if frangible, may be of any suitable material and construction, for example similar to the vinyl covering with sections separated by score-lines on the back used in connection with automotive supplemental restraint systems (SRSs, i.e., air bags). Releasable protective skins 1006 may be fastened along seams 1007 over the inflatable bladder using hook and loop fasteners (e.g., Velcro®), or using refastenable snaps, or using frangible rivets, for example made of plastic with scored or otherwise weakened shafts. Any other suitable releasable fastener may be used.

The inflatable bladder may be formed of a substantially gas-Impermeable membrane of solid material, a composite matrix such as a coated fabric, or any other suitable material that is flexible, compact when uninflated, and substantially gas-Impermeable. The inflatable bladder defines an enclosed volume, and has an edge defining an opening through which the bladder can be filled with a gas to provide buoyancy. One commonly used buoyancy-producing gas is $CO_2$. The bladder material should be substantially gas-Impermeable to the particular gas selected, such as $CO_2$.

Attached and sealed to the opening of the bladder is an automatic inflator apparatus, such as used in conventional inflatable life vests and the like (not shown). The automatic inflator may use compressed $CO_2$ supplied in standard canisters, or another suitable gas source whose presence aboard commercial air carriers is permissible.

The foregoing system, of course, provides floatation when the case lands in a water environment, but may also directly deploy a small parachute for bringing the case safely to Earth's surface. If triggered while the case is in free-fall after a catastrophic event, a parachute packed between the bladder (1502, 1602) and the protective skin 1006 may be deployed. The triggering mechanism for such deployment should be capable of detecting multiple factors pertaining to the status of the case so that deployment occurs either during free-fall in the air or on contact with Earth's surface, especially if the contacted portion of Earth's surface is that of a substantial body of water.

One exemplary operation of the automatic inflator apparatus is upon entry into a water environment. As discussed below, detection of a catastrophic event will supplement, mitigate, or completely override operation of the automatic inflator. The water entry aspect of operation of the automatic inflator may be triggered by hydrostatic or hydrodynamic action, as desired. Introduction into the trigger apparatus of water, submersion of the trigger apparatus, or hydrostatic pressure observed at the trigger apparatus can trigger the inflator, in the presence of other suitable inputs described below, as desired. One suitable actuator (Secumar® actuators made by Bernhardt Apparatebau GmbH u. Co. of Holm, GERMANY) is a conventional pill-cage actuator triggered by dissolving a pill-shaped element when immersed for a sufficient time in water. Other suitable actuators triggered by a water-soluble element or link are known. Another suitable actuator (Hammar® actuators made by Hammar AB of Göteborg, SWEDEN) is a hydrostatic trigger activated by immersion of the actuator to a set depth of water, i.e., by water pressure of a set amount. Also suitable are electronic and electromechanical sensors that are not sensitive to the direction in which they are mounted or suspended, such as used to detect flooding in residential, industrial, and shipboard spaces, among others. Alternatively, direct operation of the trigger in a manner similar to such water sensors, by sensors and a control system as described below, may trigger the inflator under other defined circumstances representing a catastrophic event.

The entire floatation apparatus should produce sufficient buoyancy to keep the entire travel case at or near the surface of a range of typical salt- and fresh-water bodies found across the world at various temperatures. A typical minimum requirement might be somewhat above 50 lbs. (or, whatever the normal maximum weight of a fully-loaded piece of hand luggage for air travel might be at the time the travel case is designed). The floatation apparatus can be arranged to remain affixed to the surface of the travel case when deployed (see FIGS. 15 and 16), or can be tethered to the travel case (FIG. 17) such that when deployed the travel case is retained some distance below the water's surface, at which the buoyant floatation apparatus floats.

Figure 16:
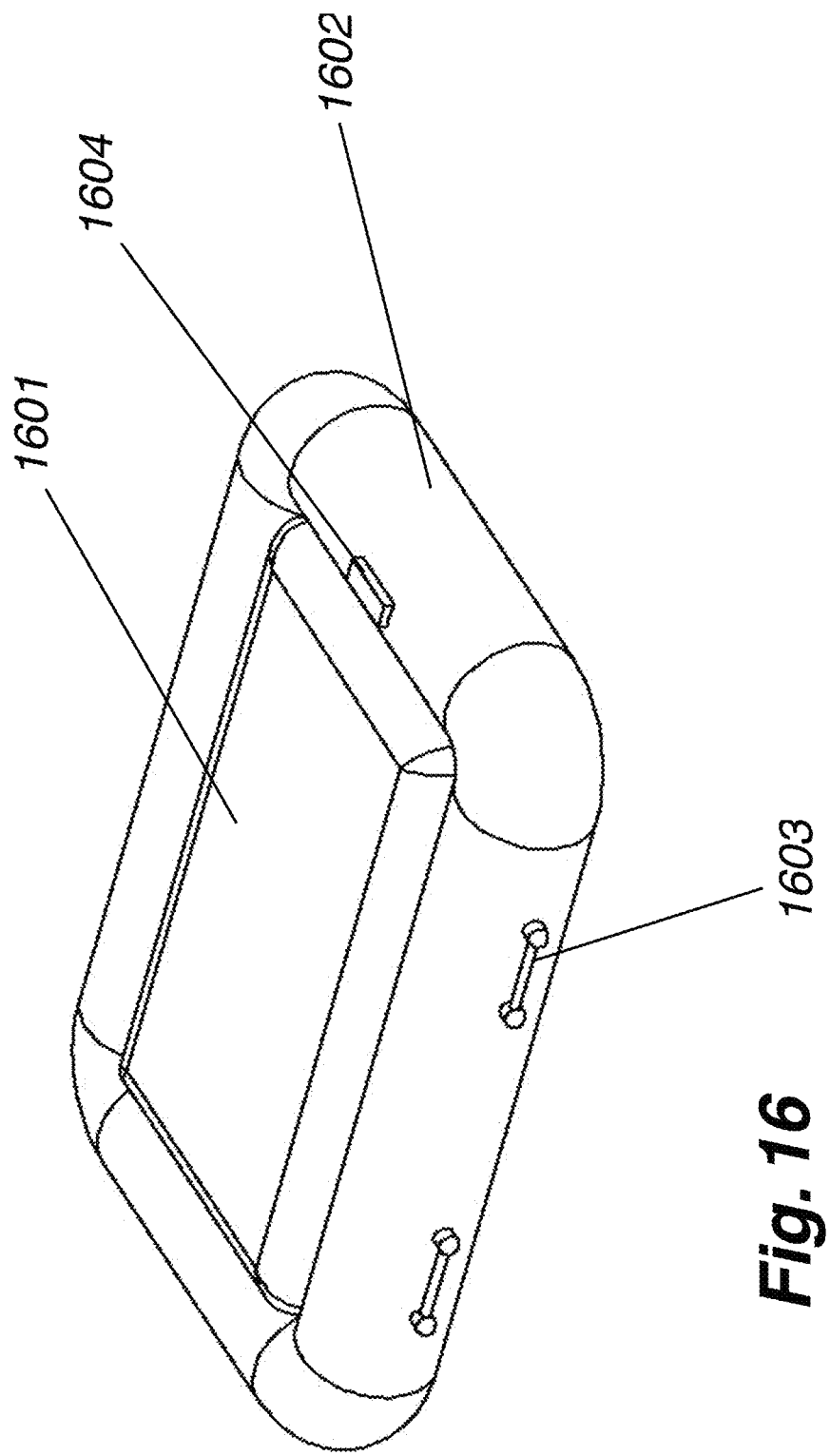
FIG. 16 is a perspective view of a travel case with floatation aid deployed according to aspects of the invention.
Figure 17:
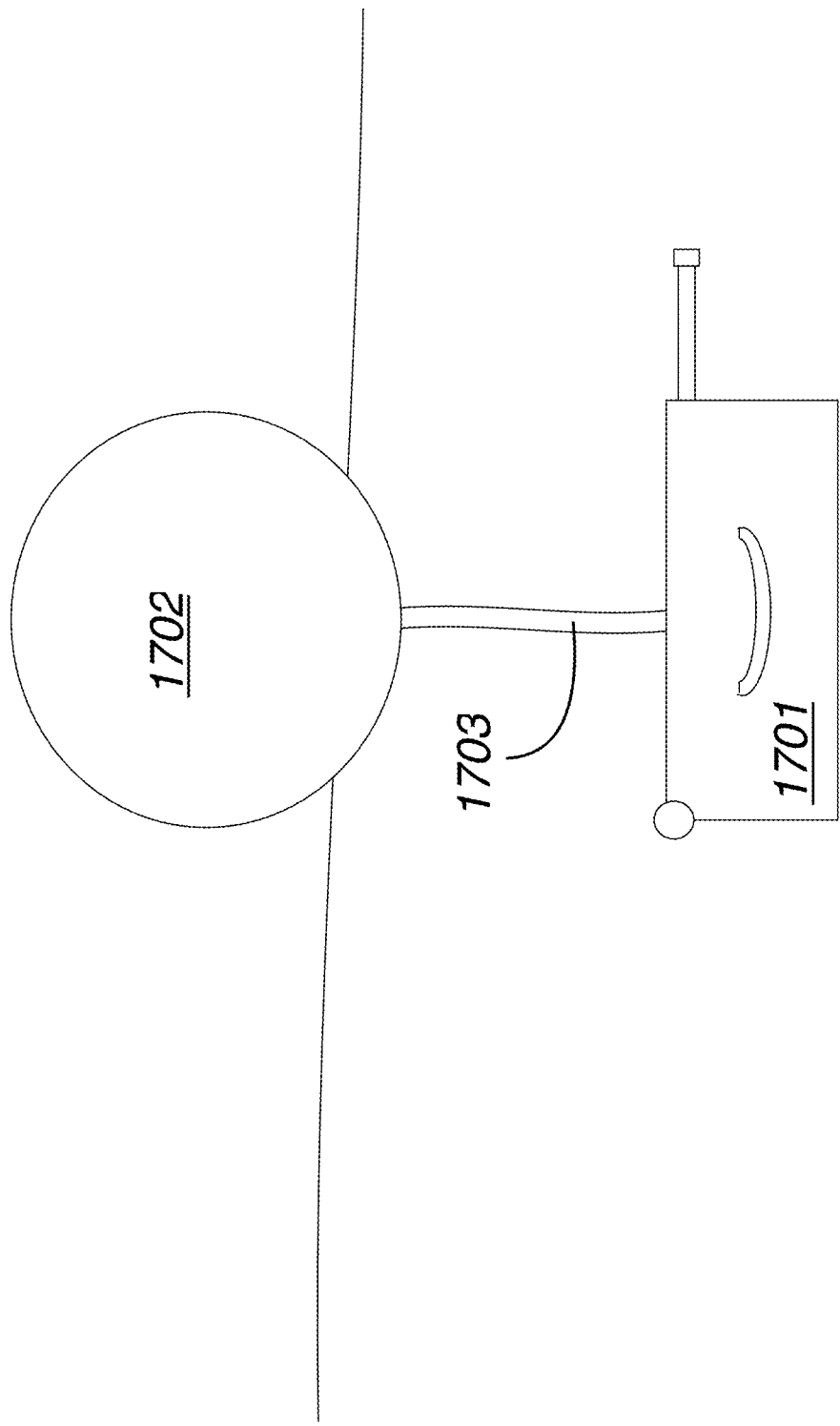
FIG. 17 is a profile view of a travel case suspended beneath a floatation aid.

If the floatation apparatus (FIG. 16, 1602) is arranged to remain affixed to the surface of the travel case (FIG. 16, 1601) when deployed, it may be further arranged to take on a roughly toroidal shape when inflated (see FIG. 16). The floatation apparatus 1602 may be further arranged to occupy a specific region of the travel case 1601 exterior, so as to keep the travel case 1601 afloat in a known orientation, as shown in FIG. 16. Keeping the travel case afloat in a known orientation allows a user in distress to access a display (see FIG. 14), an emergency hydration water pump (FIG. 11, 1101) having a water inlet (FIG. 11, 1102) and a water outlet (FIG. 11, 1103) and/or nutrition compartment, expose an antenna (see FIG. 12, 1201) or any other suitable feature desired without necessarily having to reorient the travel case or causing it to become swamped when doing so.

Figure 15:
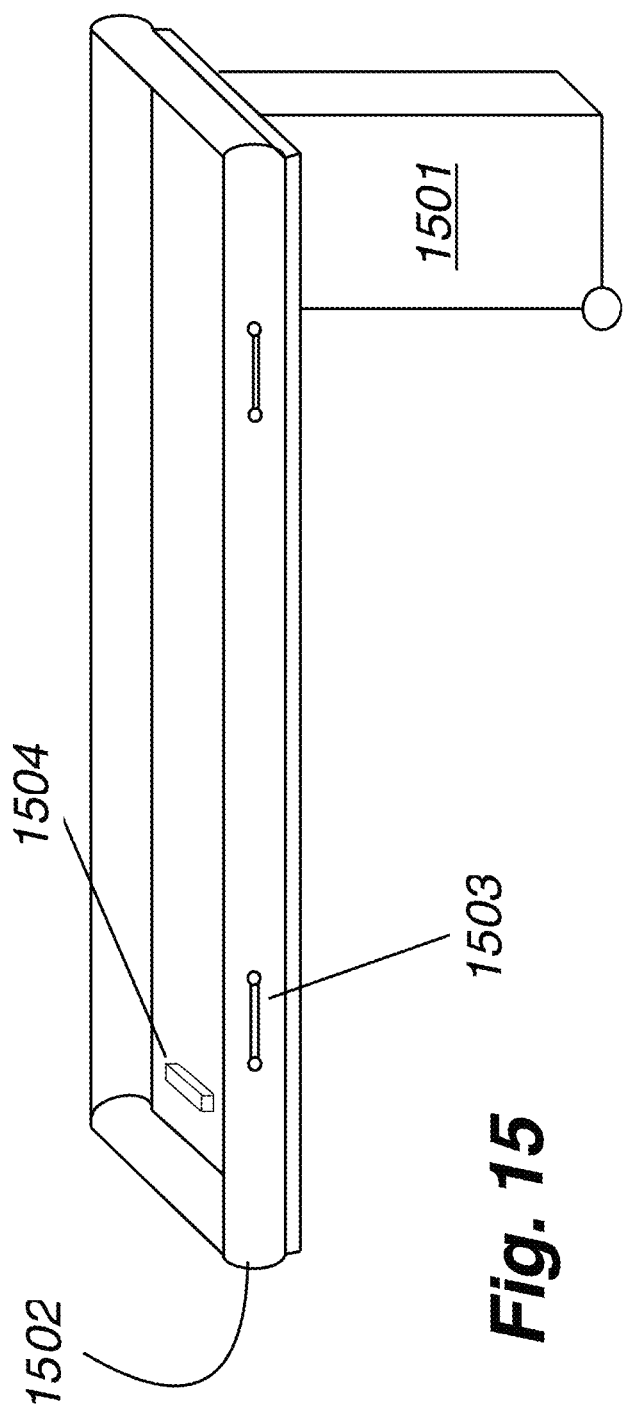
FIG. 15 is a perspective view of a large life raft deployed according to aspects of the invention.

If the floatation apparatus is provided with sufficient buoyancy, the travel case can provide personal floatation in the event the travel case is in reach of its owner at the time catastrophe strikes. In such instances, the floatation apparatus should include strapping, buckles, and looped handholds and/or footholds to facilitate fixing the floatation apparatus to the user, even after the user and the apparatus are in the water (FIGS. 15 and 16; 1503 and 1603). The floatation apparatus may further include such standard elements as a sound device, mirror, and/or immersion-activated steady or strobe light to assist in locating the travel case (FIGS. 15 and 16; 1504 and 1604).

The catastrophic event detection system described herein below can enable, lock out, or completely replace mechanical triggering of the inflator, which may include additional mechanisms for triggering in response to immersion or water pressure, as already described.

Ballistic Protection

An inner layer, surrounding any compartments for carrying items within the case, may include a layer of ballistic material. Such a layer could help protect a vehicle, such as an aircraft, from otherwise potentially hazardous materials carried within the case. Perhaps more significantly, such a layer could help protect carried items from shrapnel, pressure waves, or other impaction resulting from a catastrophic event. If fragile or sensitive items are properly packed, such a layer could reduce the risk of loss or breakage during a catastrophic event, allowing for a greater likelihood of recovery.

The inner, ballistic layer could be constructed similarly to the active layers of such items as ballistic personal armor, using similar materials. For example, the layers could include one or more layers made from one or more of a range of fabrics including ballistic nylon, those made from ultra-high-molecular-weight polyethylene fibers such as Dyneema® and Spectra®, and those made from strong aramid fibers such as Kevlar®.

Providing this type of protection from external impacts to the case, and providing this type of protection against internally carried items, could have both civilian and military applications transporting sensitive items and dangerous items. For example, in a travel case carrying sensitive, valuable items, a combination including ballistic protection together with one or more of the other survivability and location features discussed herein permits the recovery, intact, of such items even when subject to a range of transport catastrophes that would otherwise destroy the items. In another example, in a military travel case carrying arms and/or ordinance, a combination including ballistic protection together with one or more of the other survivability and location features discussed herein permits the safe recovery of the arms and/or ordinance even when subject to a range of transport catastrophes that would otherwise create unsafe conditions due to the presence of arms or unexploded ordinance, by protecting personnel handling the case from its contents until safe handling or proper disposal can be effected.

Location-Finding

Figure 9:
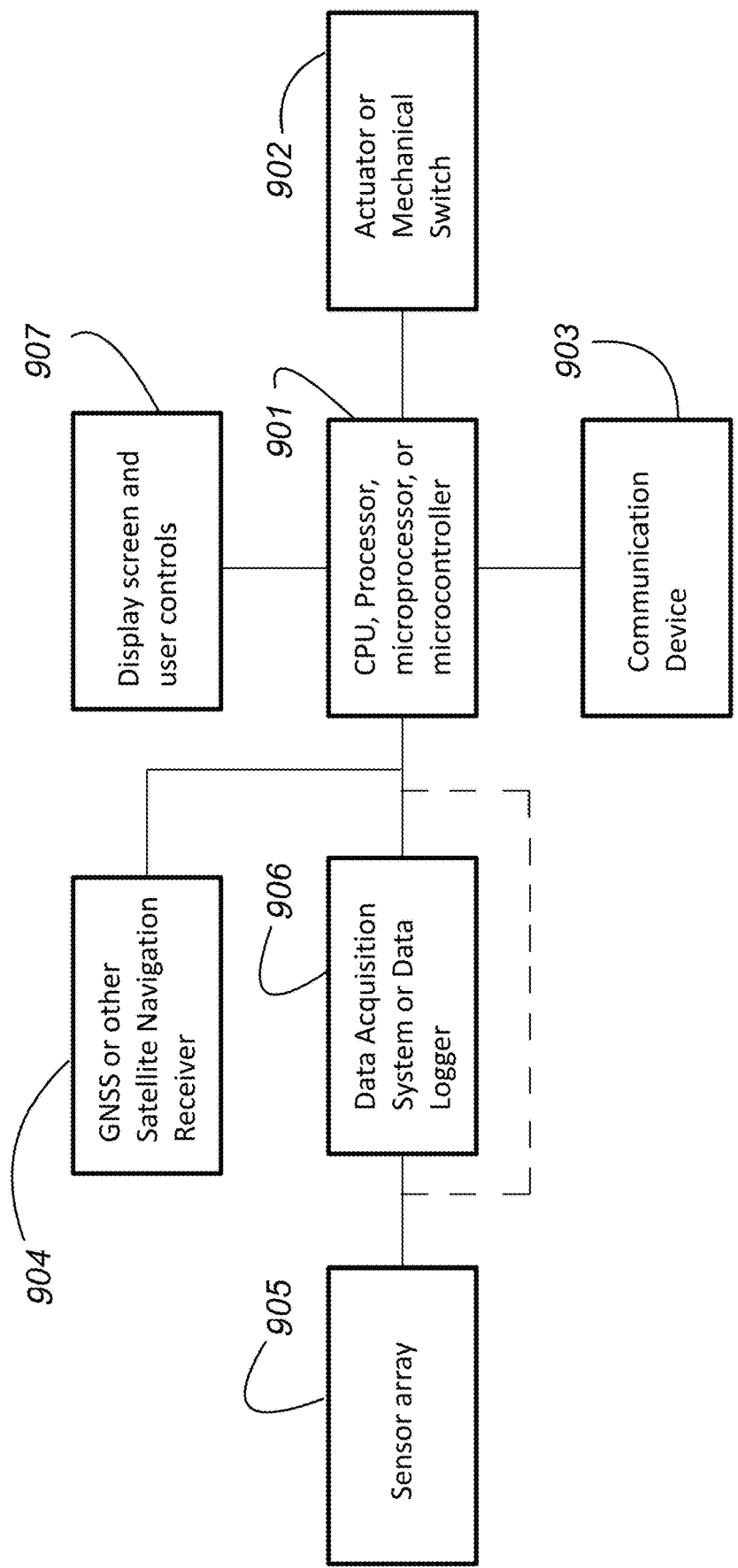
FIG. 9 is a block diagram of the electronic sensor and control system for aspects of the invention.
Figure 10:
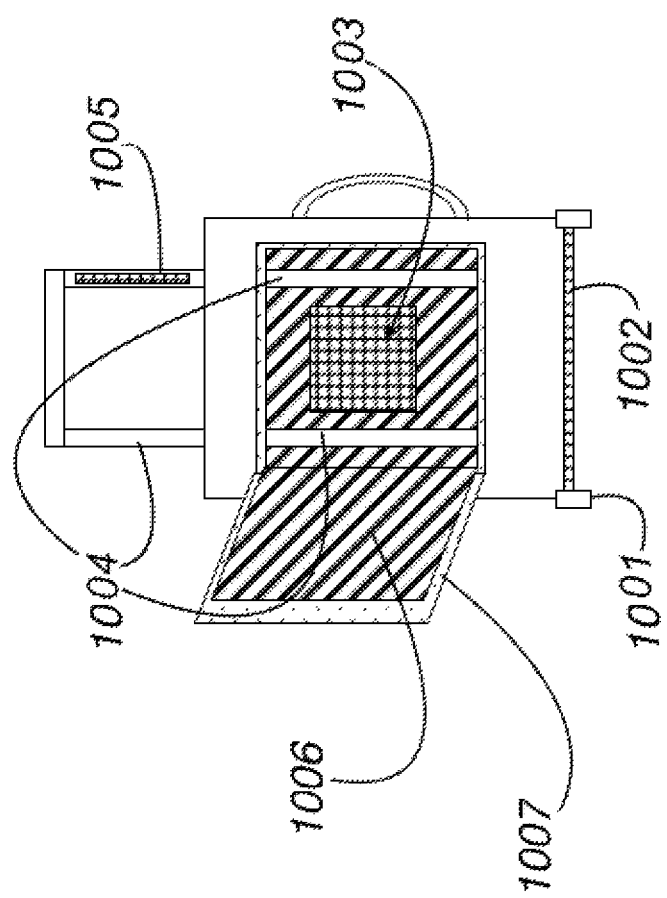
FIG. 10 is a front view of a travel case showing locations for packing elements of aspects of the invention.
Figure 11:
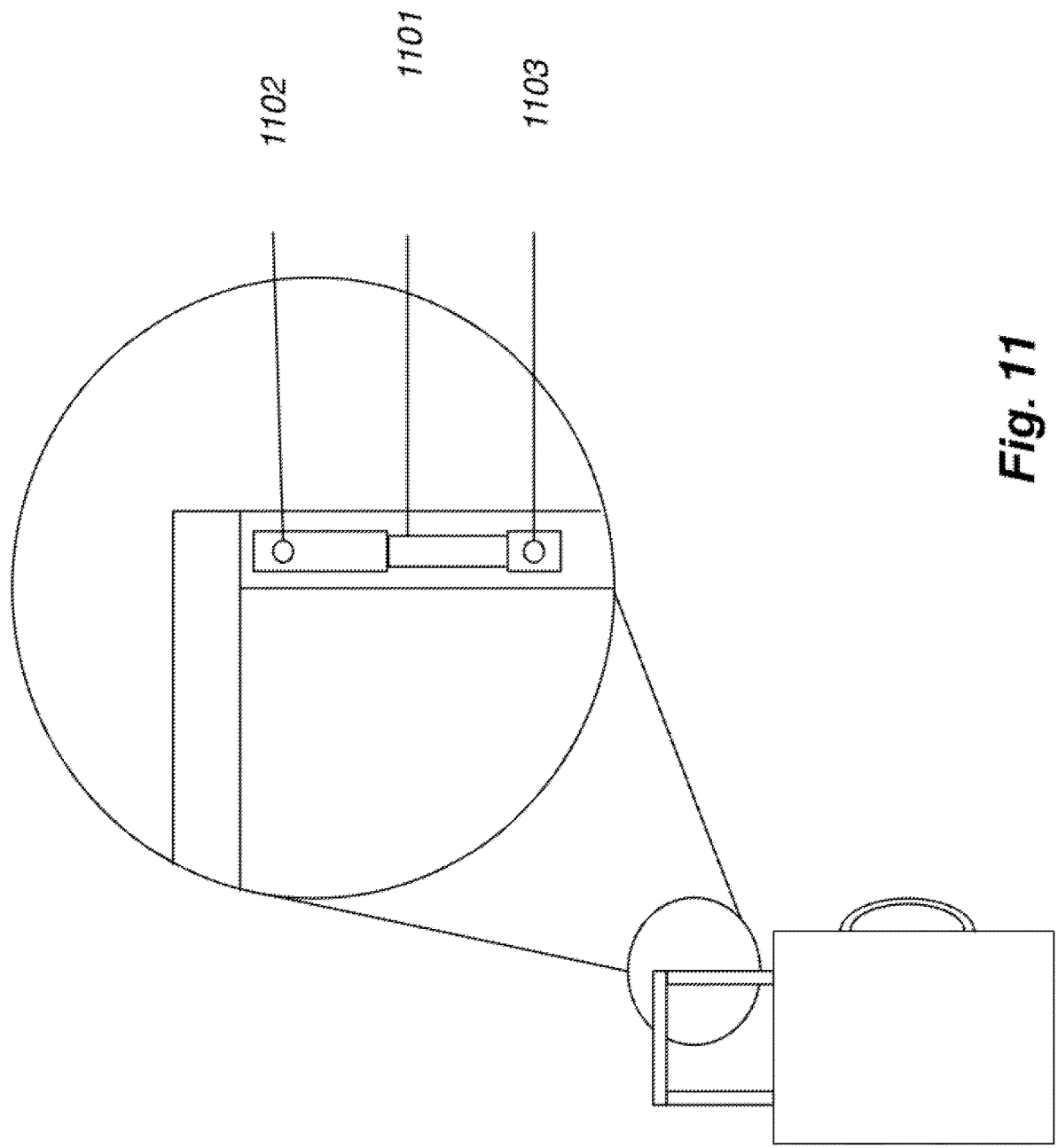
FIG. 11 is a front view of a travel case showing additional features of aspects of the invention.
Figure 12:
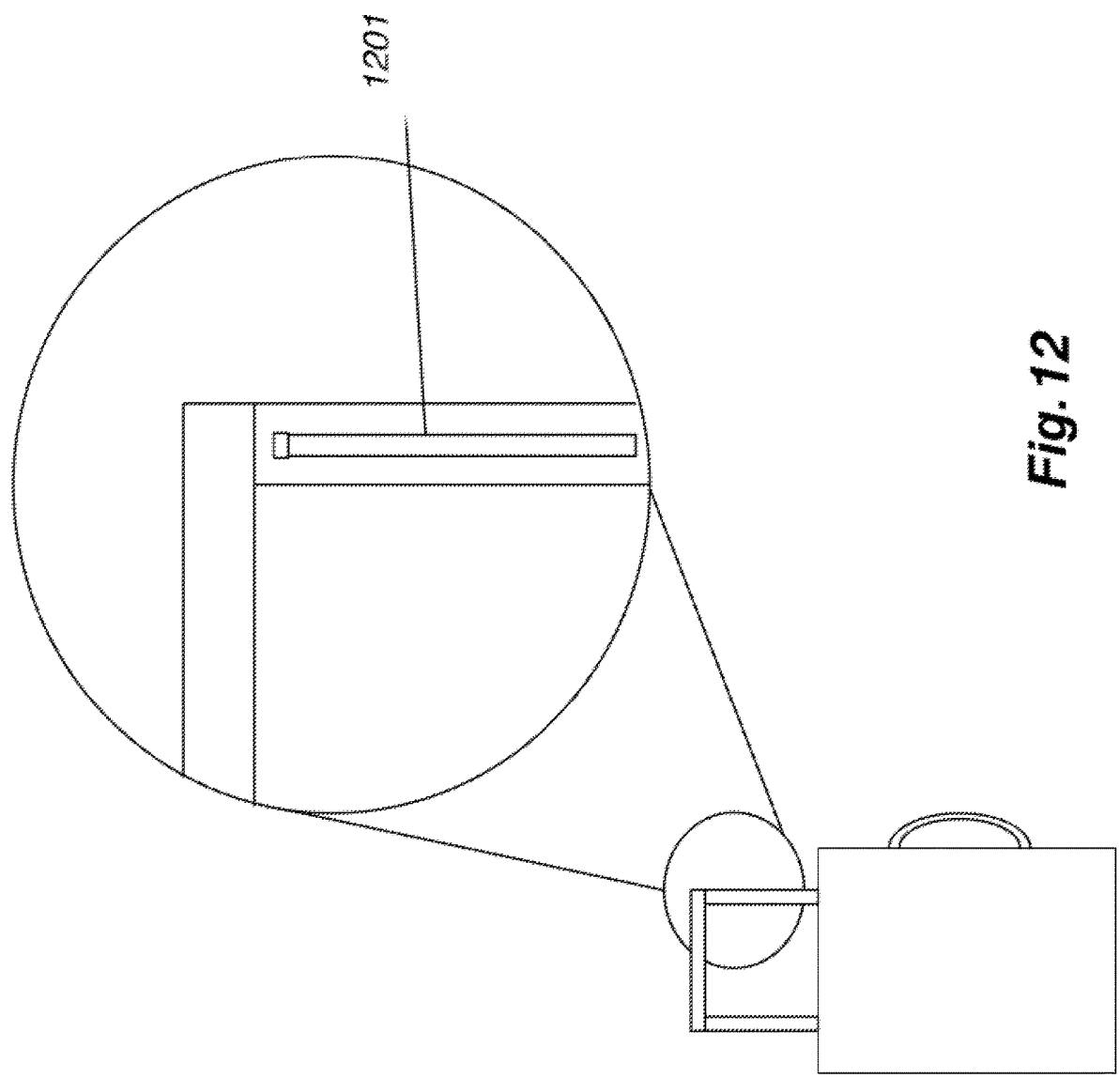
FIG. 12 is a front view of a travel case showing additional features of aspects of the invention.
Figure 13:
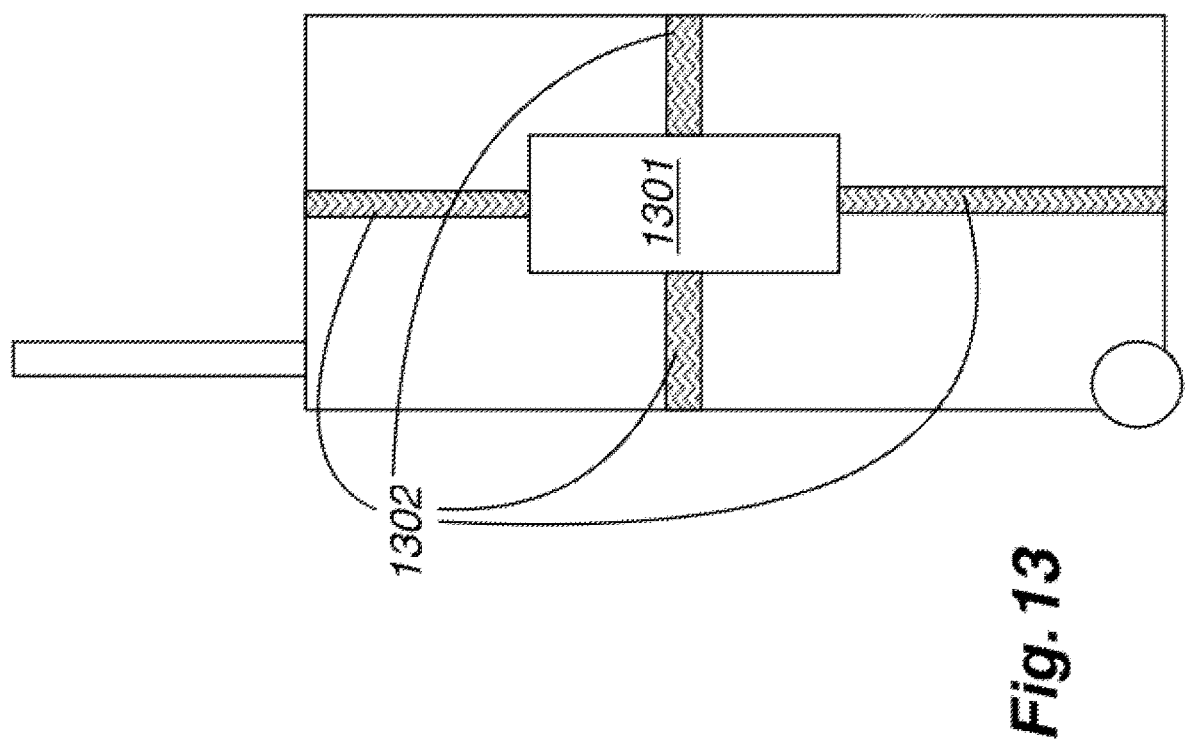
FIG. 13 is a side view of travel case showing an alternative mounting structure according to aspects of the invention.

Location-finding apparatus may be also included, to aid in locating the travel case and other debris dispersed in a catastrophic event, as shown in FIG. 9. The location-finding apparatus 904 may include a satellite position finding receiver reliant on the US-based Global Positioning System (GPS), the Russian Global Navigation Satellite System (GLONASS), the Indian Regional Navigation Satellite System (IRNSS), the Chinese BeiDou-2 navigation satellite system, the European Galileo navigation satellite system, or any other Global Navigation Satellite System (GNSS) that may be available. The location-finding apparatus may also, or alternatively, include a ground-based position finding receiver using location information derived from known ground-based transmitters such as cell phone towers or the like. The location-finding apparatus may also, or alternatively, include a directional homing beacon that allows a suitably equipped search and rescue team to find the travel case once close to its location.

Figure 14:
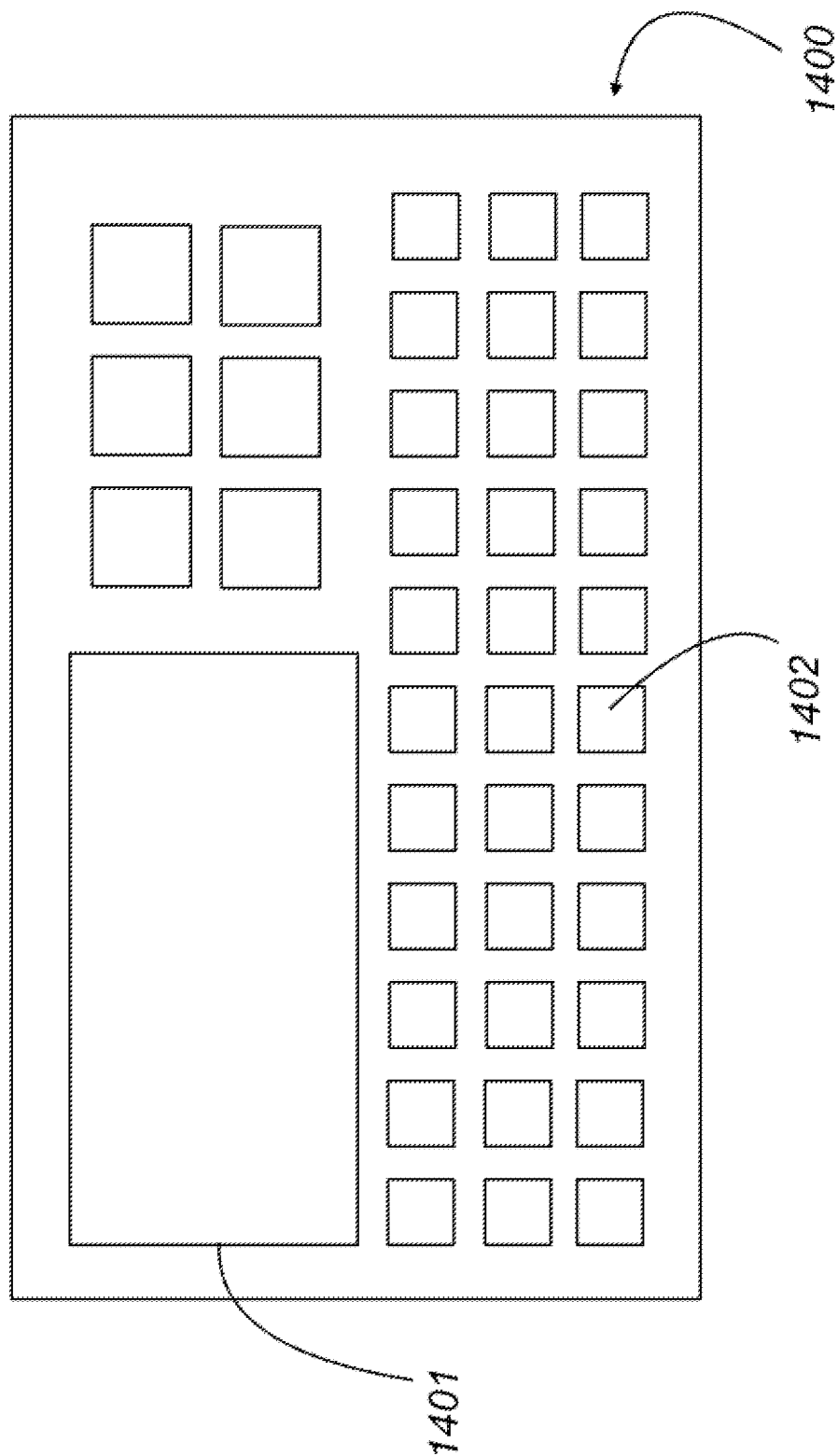
FIG. 14 is a front view of a control panel according to aspects of the invention.

The location finding apparatus can communicate the location found with an owner still in possession of the travel case through a control panel display 907 (see also FIG. 14). The display (FIG. 14, 1401) may use mapping technology, or may simply display coordinates of latitude and longitude, or both. The display can be a volatile display type, such as liquid crystal display (LCD) or light emitting diode (LED), or can be a non-volatile display type such as an electronic ink display. The control panel (FIG. 14, 1400) and all associated electronics should be sufficiently water resistant to withstand expected impact and/or immersion loading during and after a catastrophe. A small keyboard of keys and other input/output devices 1402 such as a microphone can be included. Keys and other input devices may be used control or program various functionality including, for example, functionality to show the owner, the baggage tag for the destination during the current trip, scrolling around the map, adjusting sensitivity for different vehicle types, etc.

Figure 18:
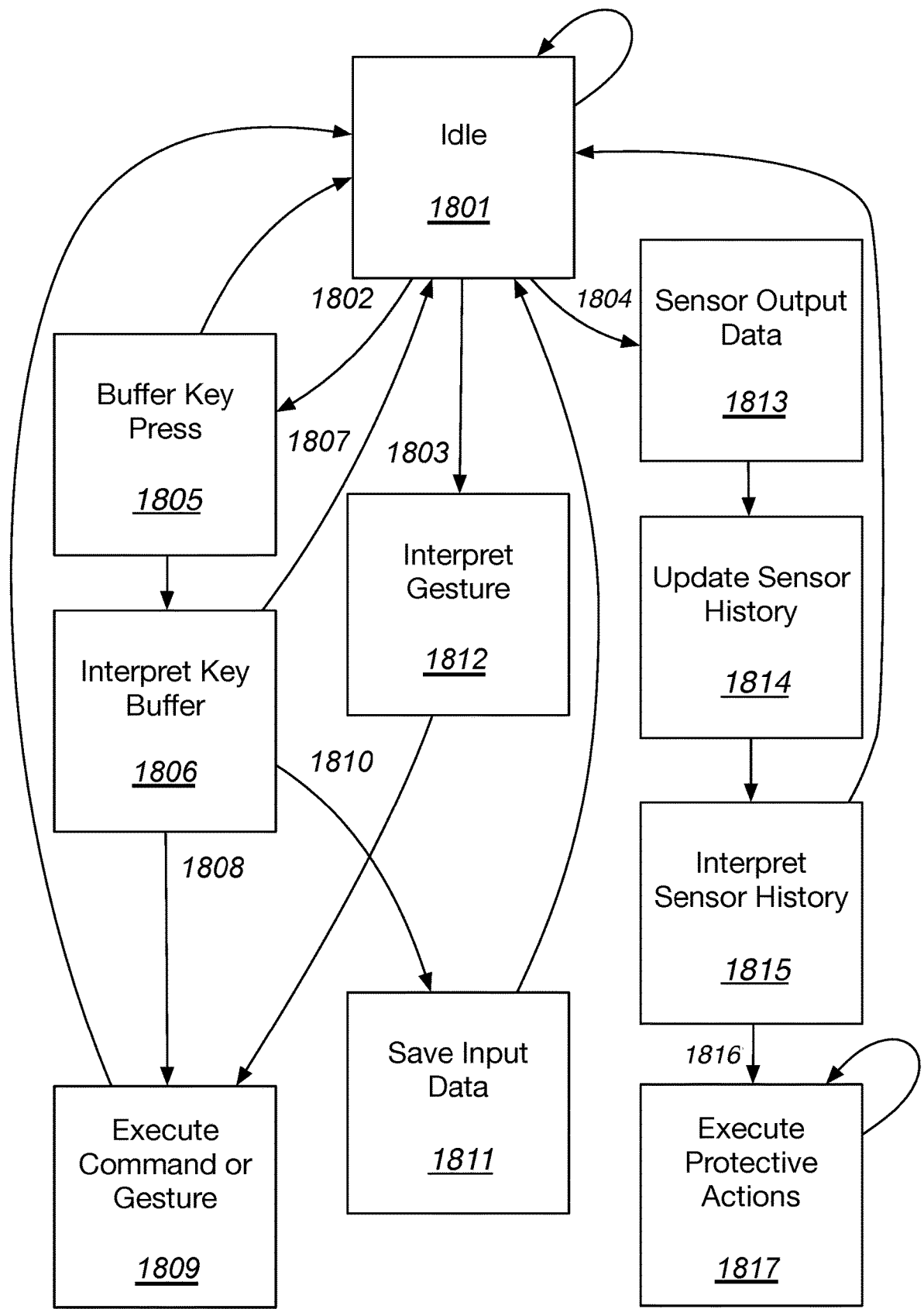
FIG. 18 is a state diagram illustrating the operation of the system controller software.

Control and interface software accessed through the control panel 1400 is illustrated in FIG. 18. The exemplary control and interface software may be an interrupt-driven executive that waits in an idle state 1801 for the occurrence of an interrupt event representing one of a key press 1802, a screen gesture 1803, or a sensor input 1804. Absent one of the foregoing interrupts, control remains in the idle state 1801.

If the interrupt event was a key press 1802, then the key pressed is buffered 1805 in a key buffer memory. The contents of the key buffer are then interpreted 1806.

Some keystrokes or combinations do not signify anything because a complete command or item of data is not represented thereby; in that case control returns 1807 to the idle state 1801, while the keystrokes collected in the key buffer are retained until confirmed to be commands or data to be interpreted, or if confirmed but interpreted to be garbage are then flushed from the key buffer. Certain keystrokes or combinations of keystrokes are interpreted to be commands 1808, and cause the system to execute those commands 1809, such as displaying on the screen luggage tag information previously stored in data memory of the system. After commands are executed 1809, control returns to the idle state 1801.

In addition to commands to be executed, data can be input, such as the baggage tag and destination information for the current trip and the type of vehicle on which the travel case is to be carried. If the interpretation of the key buffer 1806 determines the content to be input data 1810, the data is then stored 1811, before returning to the idle state 1801.

If a touch screen or similar input device is included in control panel 1400, then gestures received 1803 through the touch screen or similar input device are interpreted 1812. The gestures received and interpreted are then executed 1809 similarly to commands received by keystroke. Gestures may have meanings evident from elements of a Graphical User Interface (GUI) displayed on the control panel display or may cause other predefined manipulations of the system defined by the underlying GUI software. After gestures are executed 1809, control returns to the idle state 1801.

Each time the sensor suite produces new sensor values 1804, sensor output data 1813 is collected. This exemplary embodiment employs an interrupt-driven model, but a polled sensor system may also produce the sensor output data 1813 on a timed basis instead. The sensor output data is then stored in a memory, whereby sensor history data is updated 1814. Sensor history data is interpreted 1815, to determine whether the travel case is undergoing normal motion for the type of vehicle in which it is being carried, or whether the travel case is undergoing motion representative of a catastrophe befalling the vehicle in which it is being carried. If the interpretation is that a catastrophe has occurred 1816, then the processor will execute various protective actions 1817, such as triggering the inflation of the floatation apparatus or sending search and rescue system (SARS) messages or other communications indicating the status and/or location of the travel case. The case will remain in this state indefinitely until reset or the batteries expire.

The various inputs to the executive through the control panel 1400 may affect such behaviors as displaying a virtual luggage tag on demand, applying different algorithms to sensor inputs in order to determine the occurrence of a catastrophic event, etc. User interface and executive software such as would be suitable for this application is well-known in the computing arts.

A subsystem can also be provided, if desired, by which the executive periodically flushes the buffers of data that is no longer current or relevant. For example, a timer can trigger a process to periodically, after a period of inactivity, or based on some other suitable criteria, stuff the key buffer with a command to flush buffers, in some implementations, thus overriding prior inputs and performing the necessary flush.

Figure 19:
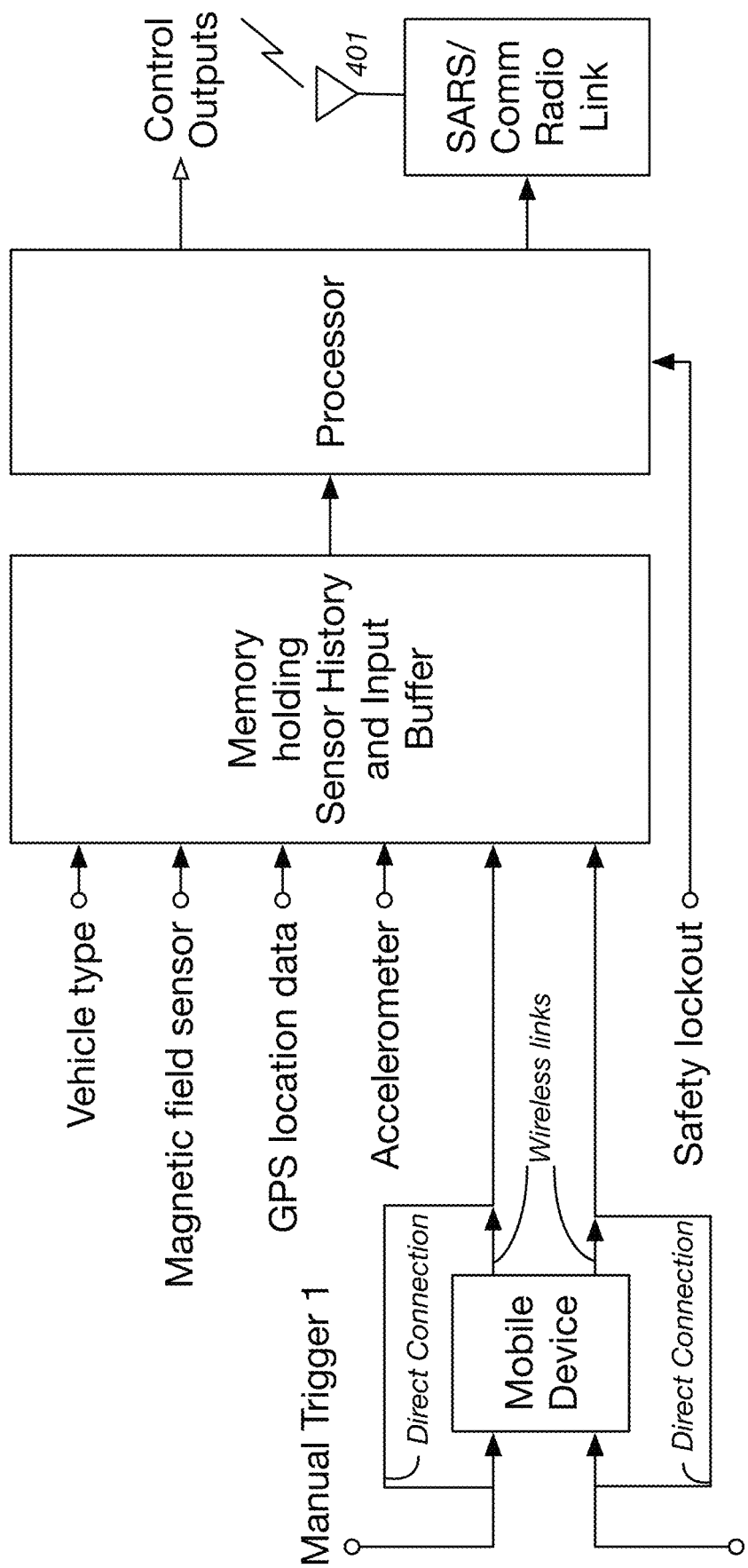
FIG. 19 is a block diagram illustrating the electronic data collection and processing system of the invention.

FIG. 19 is a block diagram illustrating the collection of sensor data and other inputs for processing into the useful outputs of the system of the travel case. Central to the input collection elements is a Memory holding Sensor History and Input Buffer. The inputs may include one or more of a Vehicle type, for example entered via control panel 1400 as described elsewhere, herein; a Magnetic field sensor signal giving three-axis magnetic field values; a GPS location data signal giving decoded, three-dimensional global position data; an Accelerometer signal giving three-axis acceleration values; Manual Trigger 1 and Manual Trigger 2 signals that allow a user to force actuation of the system by simultaneous activation of both of the Manual Trigger 1 and 2 signals; and, a Safety lockout signal that prevents output of the Control outputs and activation of the SARS/Comm Radio Link by the Processor. Manual Triggers 1 and 2 can be asserted either by direct input to the system as shown by the Direct Connections, or by wireless input via the Mobile Device and the Wireless links. The system of FIG. 19 activates the inflation mechanism, sends emergency location, search and rescue, and other communication messages, and performs other such functions as described elsewhere, herein.

In order for the antenna 1201 of the location finding apparatus to be exposed to the satellites or towers from which location information is derived, the location finding apparatus is attached to that part of the travel case that will float at the water's surface and remain oriented above the water's surface as described above. It should be affixed to that component in such a way as to face up when deployed as a result of a catastrophe. If the floatation apparatus is tethered to the travel case, which is retained below the surface, the location finding apparatus is suitably attached to the floatation apparatus. If the floatation apparatus is affixed to the travel case to form a unit that floats entirely at the surface, the location finding apparatus should be affixed to a surface of the case that the floatation apparatus causes to float upwardly as described above.

Communication

In order to communicate the location of the travel case and other messages to friends, relatives, search and rescue teams, or others, the location finding apparatus should be connected to communication device (FIG. 9, 903) that could send a message by a suitable channel. Suitable channels can include satellite channels used by search and rescue teams on 121.5 MHz and/or 406 MHz, Very High Frequency (VHF) emergency channels including the Digital Selective Calling (DSC) service channel, Single Side-Band (SSB) channels, cell phone voice or data channels, satellite phone voice or data channels, or any other channel through which an automated or other message could be communicated. If the communication device (FIG. 9, 903) includes one or more channels that support voice communication, such as VHF, SSB, cell phone, satellite phone, and others, then the communication device (FIG. 9, 903) can include a microphone positioned at a suitable location (FIG. 14, 1402) on the user display and control panel (FIG. 14, 1400).

Catastrophe Detection

The travel case can include sensors (FIG. 9, 905) and a processor (FIGS. 9, 906 and 901) that detect environmental changes indicative of the occurrence of a catastrophic event. Sensors may include GPS (eg, location finding apparatus 904), altimeters, accelerometers, magnetometers, microphones, detectors of the state of the inflation trigger, and others that are readily available and can detect movements or other environmental changes indicative of a catastrophic event warranting operation of the features of the travel case. The processor 906 and 901 receives inputs from the various sensors 905, and through its configuration and programming computes the likelihood that a catastrophic event has occurred. The processor has outputs connected to the location finding apparatus 904 and/or the inflation trigger 902 for the floatation apparatus. The processor may also activate signaling devices to help locate the travel case. It may have an output (not shown) combined with the inflation trigger 902 that activates a sonic location pinger for locating the device when submerged and/or an output (not shown) that activates a strobe light or similar signaling device.

Figure 20:
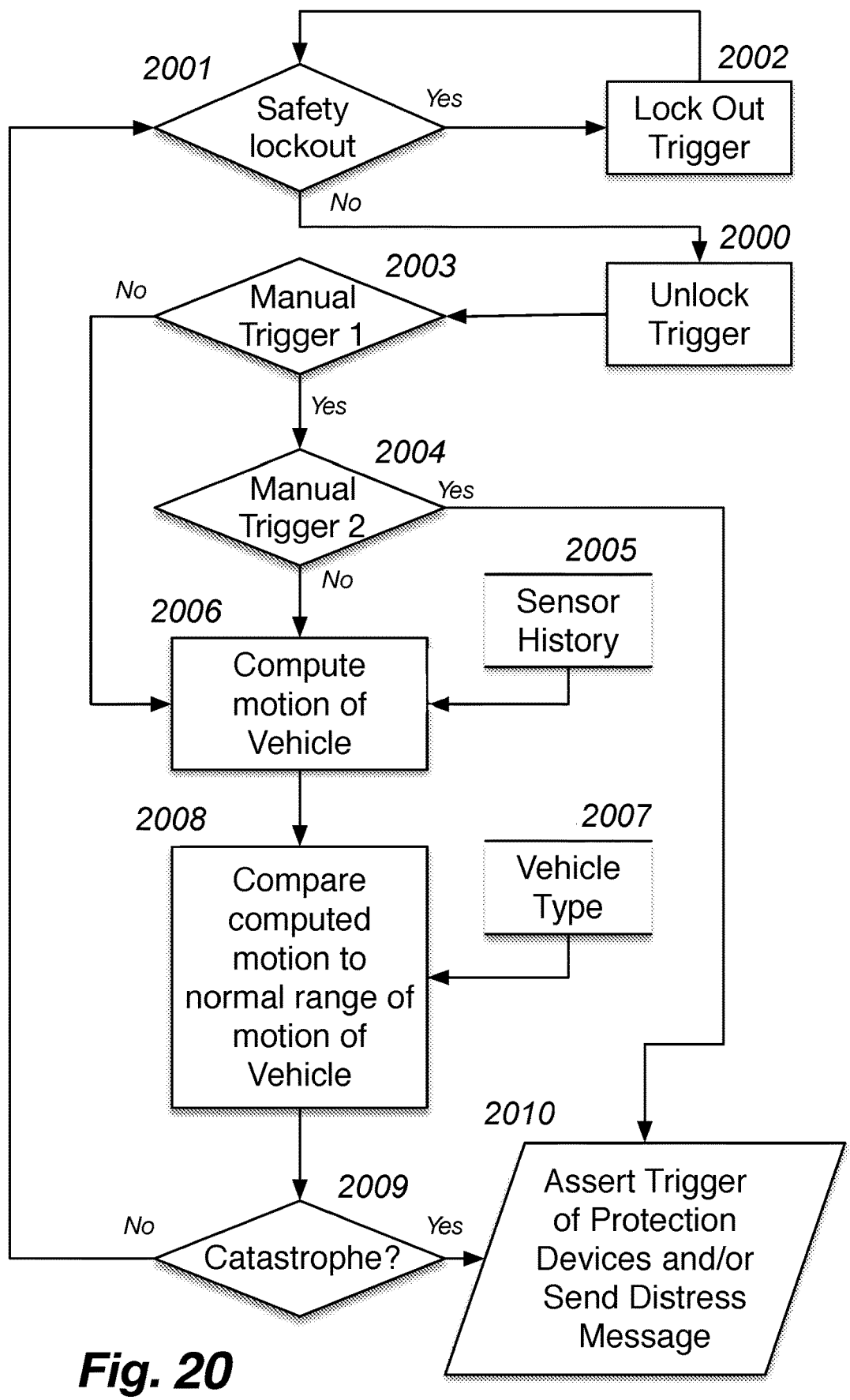
FIG. 20 is a flow chart illustrating the operation of the catastrophe detection software.

The software that receives the sensor input history and performs the analysis of that history is illustrated by the flow diagram of FIG. 20.

The software illustrated in FIG. 20 operates in a continuous loop. At the top of the loop is a sub-loop in which the software checks 2001 for the assertion of the Safety lockout signal, and if present, locks out 2002 the outputs of the Processor that control the various protection devices described elsewhere, herein. If the Safety lockout signal is not asserted, the lock out is removed 2000, and control passes to tests 2003 and 2004 for the assertion of each of the signals Manual Trigger 1 and Manual Trigger 2. If both Manual Trigger 1 and 2 are asserted, then the protections and communications mechanisms of the system are triggered 2010. If at least one of Manual Trigger 1 and 2 are de-asserted, then the motion of the vehicle is computed 2006 from the Sensor History 2005. Next, the vehicle motion computed is compared 2008 to the normal range of motion for the Vehicle Type 2007. If a catastrophe is determined to be in progress 2009, then the protections and communications mechanisms of the system are triggered 2010.

Computation of the vehicle motion 2006 from the Sensor History 2005, naturally includes analysis of the values provided over time by sensors 905, including altimeters, accelerometers, magnetometers, microphones for individual values, combinations of values, and rates of change indicative of improper vehicle motion. Vehicle motion is imputed from motion of the system 100, which is the motion actually producing the sensor 905 outputs.

Changes in altimeter, accelerometer, magnetometer, and microphone sensors are indicative of changes in the environment of the system 100. Thus, a substantial change in an altimeter output may be indicative that the system 100 is being carried in an aircraft that is in an uncontrolled descent. Similarly, a substantial change in the rate of change in an altimeter output may indicate a mechanical or pilot input issue that precedes an uncontrolled ascent or descent prior to an impending catastrophic failure of the flight. Similarly, sudden changes in an accelerometer output or magnetometer output may indicate similar sudden changes in vehicle motion preceding or during a catastrophic failure of the vehicle. Any of these may also be combined with the detection of sound by a microphone, that may confirm environmental and travel conditions in and around a vehicle such as an explosion, Impact, gunfire, or any other unusual event causing uncontrolled and possibly catastrophic movement of the vehicle.

During periods of time when the processor determines that a catastrophic event is unlikely to have occurred, the processor outputs may include inhibit signals amongst the output signals and operational controls provided to the inflation apparatus and the location finding apparatus. The inhibit signals would prevent deployment of the inflation apparatus and prevent communication by the location finding apparatus of an emergency message. During periods of time during or after determining that a catastrophic event is likely to have occurred, the processor may enable operation of the inflation apparatus and the location finding apparatus by similar output signals and operational controls, but with inverse significance. The processor may also directly trigger the inflation apparatus, rather than simply enabling or blocking operation of a local inflation trigger as previously described. Such a trigger may be delayed for a period of time or a distance travelled to ensure a desired behavior of the inflation apparatus.

Operation of the inflation apparatus may be controlled by the processor (as described above) or operation of the inflation apparatus by immersion may provide a control input to the processor indicative of the existence of a state of catastrophe, depending on the desired behavior of the travel case.

The location finding apparatus can optionally operate automatically on a periodic basis either instead of or in addition to being controlled by the processor. In addition, the user can manually operate the location finding apparatus using control panel 1400, for example to check location and/or send an "OK" message through a non-emergency channel or an emergency message through an emergency channel. The user simply enters suitable, pre-determined commands through the executive program 1800 using the control panel 1400 as described above to trigger the desired message.

The executive program 1800 can receive manual commands and activate desired operations if a person with the travel case observes a catastrophic event. For example, if a person with the travel case observes a hijacking in progress on board an aircraft on which they are traveling, the person can enter commands to initiate an emergency message transmission and/or arm the inflation actuator. The command can be entered through the control panel 1400 and the executive software 1800. Amongst its communication channels, the travel case can include a Bluetooth or other short-range wireless communication channel by which commands to the executive program 1800 can be transmitted via a cell phone or another mobile device. (See also, FIG. 19, Mobile Device.)

The system diagram of FIG. 19 illustrates a backpack system 100 in which the Mobile Device is merely a user input device that communicates the status of the Manual Trigger 1 and/or Manual Trigger 2 to the Processor carried in the travel case for combining with the other inputs received by sensors and inputs (Vehicle type, Magnetic field sensor, GPS location data, and Accelerometer) also carried in the travel case. Other configurations and partitions of the system are possible, as illustrated by the alternative partitioning of FIG. 21.

Figure 21:
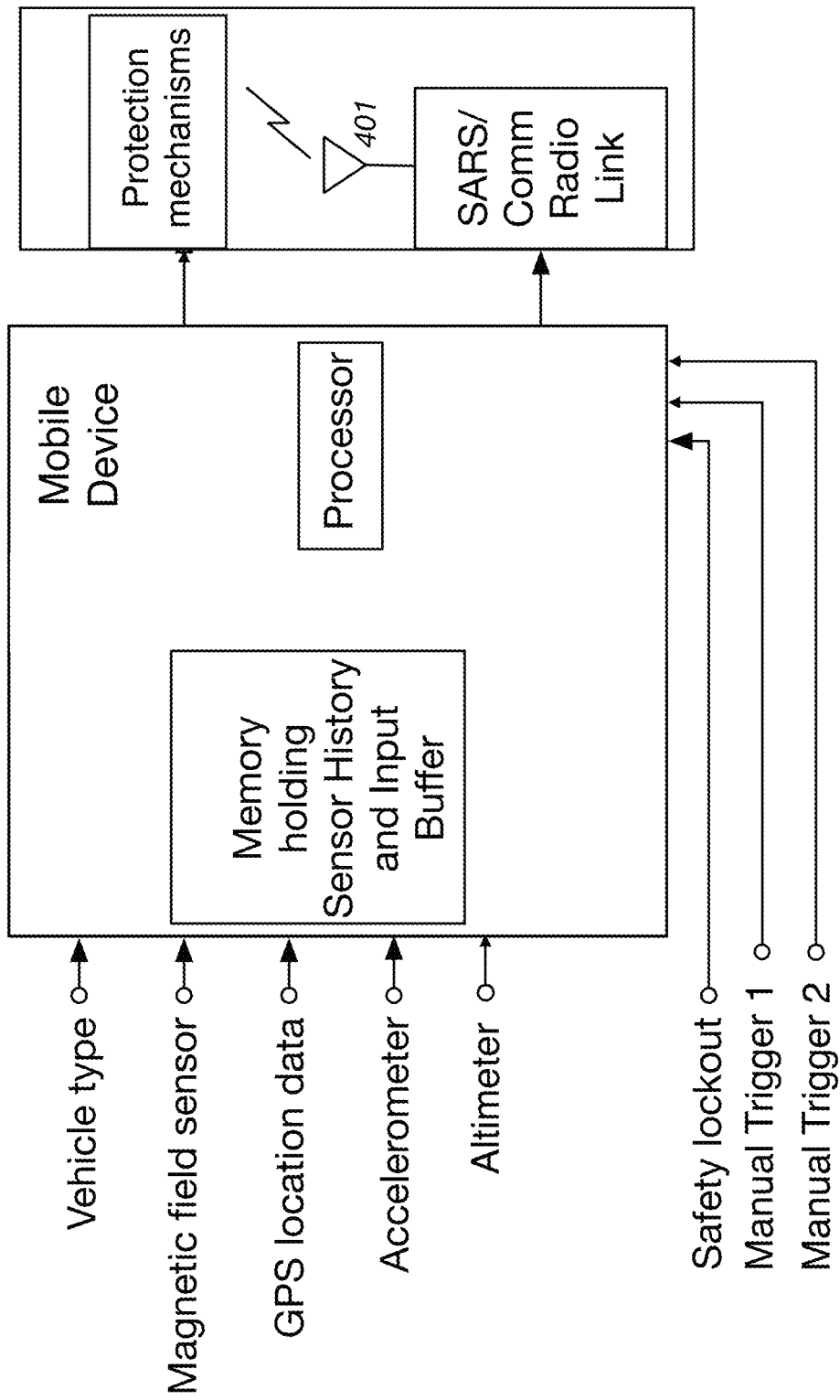
FIG. 21 is a block diagram illustrating the electronic data collection and processing system of another embodiment of the invention.

In FIG. 21, the Mobile Device carried by many individuals today, such as smart phones or tablet computers, may include all of the sensor and other input devices, and may directly control the mechanisms contained in the travel case or even directly communicate with the user or others. In the illustrative system of FIG. 21, the Mobile Device receives user input data directly or receives sensor input data from one or more sensors (Magnetic field sensor data received from an internal magnetic field sensor, GPS location data received from an internal GPS receiver, Accelerometer data received from an internal accelerometer, and Altimeter data received from an internal altimeter) built into the Mobile Device. In that case, the Mobile Device includes a Processor capable of executing the functions defined in FIGS. 18 and 20, given the inputs identified, perhaps along with others.

The Processor, in turn, produces the output signals required to trigger the Protections Mechanisms of the travel case, such as an automatic inflator for floatation; and also produces the output signals required to control a SARS/Comm Radio Link capable of contacting interested Individuals or organizations regarding the status of the travel case. Such contact may include direct satellite communication of position, condition, and other information with SARS personnel or organizations; or may include satellite, other radio, or telephonic communication of position, condition, and other information with parties or organizations designated by a user or agreed upon by convention.

In the system of FIG. 21, the output signals produced by the Processor may be transmitted to the Protection Mechanisms and to the SARS/Comm Radio Link either through a wireless or wired communication connection. The SARS/Comm Radio Link may optionally even be completely contained within the Mobile Device, rather than in the travel case, or may be divided between the Mobile Device and the travel case (eg, having a SARS satellite radio built into the travel case and cellular, WIFI, or other communications links built into the Mobile Device, any of which can be independently activated for communicating emergency or status "OK" messaging as needed or desired based on the user inputs and the computations of the Processor described herein.

System Operation

The travel case can function as a fully integrated system capable of providing one or more of the following functions: detecting and alerting others to an incipient or ongoing catastrophic event; protecting contents from environmental damage; aiding in the location of a vehicle, its contents, and/or its passengers after suffering a catastrophic event; and providing some level of support to survivors of a catastrophic event. In order to function as such a fully integrated system, a number of the components parts described above should be constructed and arranged to cooperate to produce desired functional results.

The components responsible for detecting a catastrophe may be integrated with those for sending an alert and/or those for triggering deployment of a floatation aid. These components must function without interfering with the operation of the vehicle in which the travel case is carried and without raising any security concerns with respect to the vehicle.

For example, premature or unneeded deployment of the floatation aid should be avoided. This may be accomplished through the use of multiple sensors and well-developed algorithms for characterizing the environment and circumstances over time of the travel case. An immersion trigger has been suggested above as an appropriate sensor and trigger system for deploying floatation when the travel case is immersed in water. A more robust system could arm the immersion trigger only when GPS position information indicates passage over water or when incremental changes in GPS position information indicate an erratic or otherwise unusual travel path of the vehicle. Another more robust system could arm the immersion trigger when accelerometers detect unexpected or unusual sudden changes in velocity (speed and/or direction). A simple pressure switch system on the handle(s) of the travel case could prevent arming of the immersion trigger while the case is being hand-carried, and permit arming of the immersion trigger when the case is set down or loaded into the vehicle. Similar systems can be used where the trigger is more comprehensive of environmental factors indicative of a catastrophic event, but where the triggering is undesirable while the case is being hand carried, for example.

Travel cases of various sizes could accommodate the inventive system. For example, cases for airline passengers' personal articles could incorporate some or all of the features described, and be small and free enough within the airline cabin to either be carried out with a passenger in an emergency, or to float free in the event of a massively destructive event. The low mass of such small items would help preserve them in a high-energy, destructive event, allowing them to serve their function of aiding in the location of the remains of such an event. Larger suitcases and equipment cases could incorporate additional features, larger battery power supplies, and larger, more versatile, rescue features, such as rudimentary rescue raft flotation.

Use of the invention both for personal possessions of travelers and for other articles transported in portable cases could reduce insurance rates for those forms of transportation of small articles and provide additional management controls to logistics managers responsible for the transportation of such small articles. The limited size and weight of the cases, for example suitcases carried by air are often limited to 50 lbs, reduces the energy required to be absorbed by the case upon an impact. This has resulted for example in passenger possessions being amongst the articles recovered intact from an otherwise catastrophic aircraft loss.

Various combinations of the foregoing features and elements can be made, and are contemplated as within the scope of the present invention.

What is claimed is:

1. A backpack system, comprising:
    a case body defining an interior cavity in which to carry articles and an exterior shell, having a mass and volume when fully loaded with articles suitable for an individual to carry;

a locator beacon, including a communications transmitter capable of signaling a remote party and a geo-locating apparatus;

an inflatable floatation aid fixed to the exterior shell;

an inflator in communication with the inflatable floatation aid, for inflation of the inflatable floatation aid;

sensors sensitive to plural environmental parameters of the backpack system, including at least two from a list including an altimeter, an accelerometer, a magnetometer, and a microphone; and a processor incorporated in a separate mobile device carried by the individual, which combines the sensor inputs and has an output controlling the locator beacon and the inflator, the mobile device comprising at least one of a cell phone and a tablet computer;

wherein the locator beacon and the inflator operate automatically responsive to plural sensor inputs which combined are indicative of a catastrophic event during air travel.

2. The backpack system of claim 1, wherein one of the sensors is the accelerometer, and the processor determines a catastrophic event responsive to sudden changes in accelerometer output consistent with changes in vehicle motion preceding and during a catastrophic failure of the vehicle.

3. The backpack system of claim 2, wherein the sudden changes in accelerometer output include sudden changes in a rate of change of accelerometer output consistent with an abnormal change in an aircraft performance parameter.

4. The backpack system of claim 1, wherein one of the sensors is the microphone, and the processor determines a catastrophic event further responsive to microphone sound output consistent with environmental and travel conditions causing uncontrolled movement of the vehicle.

5. The backpack system of claim 4, wherein one of the sensors is the magnetometer, and the processor determines a catastrophic event further responsive to sudden changes in a rate of change of magnetometer output.

6. The backpack system of claim 1, wherein one of the sensors is the magnetometer, and the processor determines a catastrophic event responsive to sudden changes in magnetometer output.

7. The backpack system of claim 6, wherein one of the sensors is the microphone, and the processor determines a catastrophic event further responsive to microphone sound output.

8. The backpack system of claim 1, wherein the locator beacon includes at least one component communicating over channels incorporated in the mobile device.

9. The backpack system of claim 1, wherein the processor controls the inflator, a SARS satellite radio link, and a terrestrial radio link incorporated in the case body.

10. The backpack system of claim 1, wherein the processor controls both a SARS satellite radio link and a terrestrial radio link incorporated in the mobile device.

11. The backpack system of claim 1, wherein one of the sensors is the altimeter, and the processor determines a catastrophic event responsive to changes in altimeter output consistent with an uncontrolled descent.

12. The backpack system of claim 1, wherein the sudden changes in altimeter output include changes in a rate of change of altimeter output consistent with an uncontrolled ascent or descent.

* * * * *